(12) United States Patent
Tang

(10) Patent No.: US 10,575,283 B2
(45) Date of Patent: Feb. 25, 2020

(54) METHOD AND DEVICE FOR INTER-DEVICE COMMUNICATION

(71) Applicant: GUANGDONG OPPO MOBILE TELECOMMUNICATIONS CORP., LTD., Dongguan (CN)

(72) Inventor: Hai Tang, Dongguan (CN)

(73) Assignee: GUANGDONG OPPO MOBILE TELECOMMUNICATIONS CORP., LTD, Dongguan, Guangdong (CN)

( * ) Notice: Subject to any disclaimer, the term of this patent is extended or adjusted under 35 U.S.C. 154(b) by 0 days.

(21) Appl. No.: 16/085,549

(22) PCT Filed: Apr. 29, 2016

(86) PCT No.: PCT/CN2016/080803
§ 371 (c)(1),
(2) Date: Sep. 14, 2018

(87) PCT Pub. No.: WO2017/185369
PCT Pub. Date: Nov. 2, 2017

(65) Prior Publication Data
US 2019/0335440 A1 Oct. 31, 2019

(51) Int. Cl.
*H04W 72/04* (2009.01)
*H04W 72/02* (2009.01)
(Continued)

(52) U.S. Cl.
CPC ....... *H04W 72/0406* (2013.01); *H04W 72/02* (2013.01); *H04W 84/20* (2013.01); *H04W 92/18* (2013.01)

(58) Field of Classification Search
CPC ... H04W 36/0007; H04W 48/10; H04W 4/06; H04W 56/001; H04W 72/005;
(Continued)

(56) References Cited

U.S. PATENT DOCUMENTS

2001/0012757 A1 8/2001 Boyle
2005/0113102 A1 5/2005 Kwon
(Continued)

FOREIGN PATENT DOCUMENTS

CN 101072390 A 11/2007
CN 101610567 A 12/2009
(Continued)

OTHER PUBLICATIONS

Partial Supplementary European Search Report in European application No. 16899880.5, dated Jan. 16, 2019.
(Continued)

*Primary Examiner* — Tan H Trinh
(74) *Attorney, Agent, or Firm* — Ladas & Parry, LLP

(57) ABSTRACT

Provided is a method and device for inter-device communication, the method comprising: a first terminal device is determined to be a central terminal device for a first group, wherein the first group comprises the central terminal device and at least one member terminal device; and the first terminal device allocates a first radio resource for a second terminal device, such that the second terminal device carries out inter-device communication according to the first radio resource, wherein the second terminal device belongs to the member terminal devices of the first group. The present invention is capable of improving the efficiency and reliability of inter-device communication.

16 Claims, 4 Drawing Sheets

(51) Int. Cl.
*H04W 84/20* (2009.01)
*H04W 92/18* (2009.01)

(58) Field of Classification Search
CPC ............. H04W 72/02; H04W 72/0446; H04W 72/085; H04W 84/20
USPC .......... 455/41.1, 41.2, 517, 518, 519, 452.1, 455/426.1; 370/311, 320, 254, 329
See application file for complete search history.

(56) References Cited

U.S. PATENT DOCUMENTS

| | | | |
|---|---|---|---|
| 2007/0109989 A1 | 5/2007 | Nakagawa | |
| 2007/0177570 A1 | 8/2007 | Kwon | |
| 2011/0268004 A1* | 11/2011 | Doppler | H04W 72/02 370/311 |
| 2011/0271334 A1* | 11/2011 | Yang | H04L 63/083 726/7 |
| 2012/0063335 A1 | 3/2012 | Cho | |
| 2012/0106517 A1 | 5/2012 | Charbit | |
| 2013/0046841 A1* | 2/2013 | Park | H04W 4/08 709/206 |
| 2013/0148637 A1* | 6/2013 | Yang | H04W 72/042 370/336 |
| 2013/0172036 A1* | 7/2013 | Miklos | H04W 8/005 455/517 |
| 2013/0273907 A1* | 10/2013 | Vikberg | H04W 48/02 455/426.1 |
| 2014/0010102 A1 | 1/2014 | Cho et al. | |
| 2014/0126567 A1 | 5/2014 | Husain | |
| 2014/0269459 A1 | 9/2014 | Fan | |
| 2014/0295913 A1 | 10/2014 | Gupta | |
| 2014/0321355 A1 | 10/2014 | Choi | |
| 2014/0335853 A1 | 11/2014 | Sartori et al. | |
| 2015/0036496 A1 | 2/2015 | Shan | |
| 2015/0055567 A1* | 2/2015 | Narasimha | H04W 76/14 370/329 |
| 2015/0063350 A1 | 3/2015 | Sundaram et al. | |
| 2015/0066881 A1 | 3/2015 | Sundaram et al. | |
| 2015/0085833 A1 | 3/2015 | Han | |
| 2015/0105076 A1 | 4/2015 | Gupta et al. | |
| 2015/0131482 A1* | 5/2015 | Noh | H04W 8/005 370/254 |
| 2015/0148074 A1 | 5/2015 | Phan et al. | |
| 2015/0189677 A1 | 7/2015 | Han et al. | |
| 2015/0223257 A1* | 8/2015 | Wilhelmsson | H04W 72/082 455/452.1 |
| 2015/0282142 A1* | 10/2015 | Dahlman | H04W 84/20 370/329 |
| 2015/0334693 A1* | 11/2015 | Lu | H04W 72/04 370/329 |
| 2015/0350949 A1* | 12/2015 | Wang | H04W 16/14 370/230 |
| 2015/0359023 A1 | 12/2015 | Stojanovski | |
| 2015/0359033 A1 | 12/2015 | Stojanovski | |
| 2015/0365942 A1 | 12/2015 | Niu et al. | |
| 2015/0373596 A1 | 12/2015 | Yiu | |
| 2016/0014589 A1 | 1/2016 | Niu | |
| 2016/0021526 A1 | 1/2016 | Niu et al. | |
| 2016/0143077 A1 | 5/2016 | Fodor et al. | |
| 2016/0165411 A1 | 6/2016 | Lee et al. | |
| 2016/0165414 A1 | 6/2016 | Lee et al. | |
| 2016/0165561 A1 | 6/2016 | Lee et al. | |
| 2016/0165658 A1 | 6/2016 | Lee et al. | |
| 2016/0174276 A1 | 6/2016 | Lee et al. | |
| 2016/0174284 A1 | 6/2016 | Lee et al. | |
| 2016/0309284 A1 | 10/2016 | Lee et al. | |
| 2016/0309405 A1 | 10/2016 | Gupta | |
| 2017/0086160 A1 | 3/2017 | Smith et al. | |
| 2017/0135072 A1* | 5/2017 | Yokomakura | H04W 72/0406 |
| 2017/0150330 A1* | 5/2017 | Kim | H04W 4/90 |
| 2017/0150527 A1* | 5/2017 | Duval | H04W 8/005 |
| 2017/0207986 A1 | 7/2017 | Sundaram et al. | |
| 2017/0245302 A1* | 8/2017 | Mukherjee | H04W 16/14 |
| 2017/0251510 A1* | 8/2017 | Kitagawa | H04W 16/14 |
| 2017/0367136 A1 | 12/2017 | Sartori et al. | |
| 2018/0027401 A1 | 1/2018 | Niu et al. | |
| 2018/0027538 A1* | 1/2018 | Uchiyama | H04W 72/0406 370/329 |
| 2018/0027565 A1* | 1/2018 | Kwon | H04W 76/14 370/329 |
| 2018/0227738 A1 | 8/2018 | Gupta et al. | |
| 2018/0234829 A1 | 8/2018 | Niu et al. | |
| 2019/0045483 A1* | 2/2019 | Tabet | H04W 72/005 |
| 2019/0090214 A1 | 3/2019 | Sartori et al. | |
| 2019/0124583 A1* | 4/2019 | Tang | H04W 4/023 |
| 2019/0191404 A1* | 6/2019 | Tang | H04W 48/16 |
| 2019/0320443 A1* | 10/2019 | Wang | H04W 48/16 |

FOREIGN PATENT DOCUMENTS

| | | |
|---|---|---|
| CN | 102932751 A | 2/2013 |
| CN | 104333888 A | 2/2015 |
| CN | 104540107 A | 4/2015 |
| CN | 104937859 A | 9/2015 |
| EP | 1657854 A1 | 5/2006 |
| TW | 200616479 A | 5/2006 |
| WO | 2010082084 A1 | 7/2010 |
| WO | 2012151316 A1 | 11/2012 |
| WO | 2014054990 A1 | 4/2014 |
| WO | 2014205692 A1 | 12/2014 |
| WO | 2015020375 A1 | 2/2015 |
| WO | 2015169239 A1 | 11/2015 |

OTHER PUBLICATIONS

English Translation of the Written Opinion of the International Search Authority in international application No. PCT/CN2016/080803, dated Jan. 25, 2017.
Supplementary European Search Report in the European application No. 16899880.5, dated Apr. 18, 2019.
International Search Report in international application No. PCT/CN2016/080803, dated Jan. 25, 2017.
Written Opinion of the International Search Authority in international application No. PCT/CN2016/080803, dated Jan. 25, 2017.

* cited by examiner

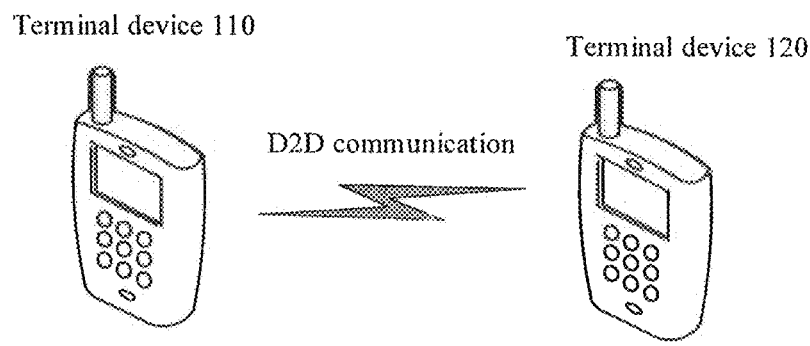

Terminal device 110    Terminal device 120

D2D communication

| determine a first terminal device to be a central terminal device of a first group, wherein the first group includes the central terminal device and at least one member terminal device | S210 |

| The first terminal device allocates a first radio resource to second terminal device to enable the second terminal device to perform D2D communication according to the first radio resource, wherein the second terminal device is a member terminal device of the first group | S220 |

FIG. 2

300
Determine a second terminal device to be a member terminal device of a first group, wherein the first group includes the central terminal device and at least one member terminal device — S310
The second terminal device performs D2D communication with a first radio resource allocated by the central terminal device of the first group — S320
FIG. 4
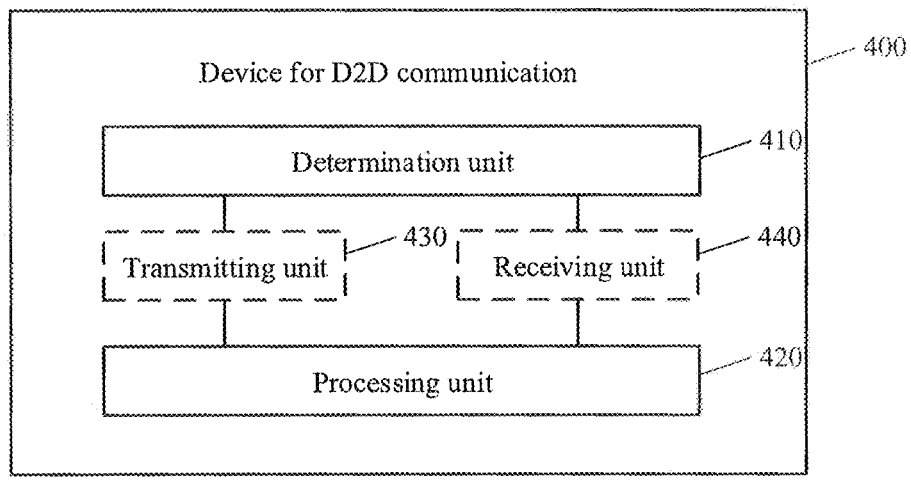
FIG. 5
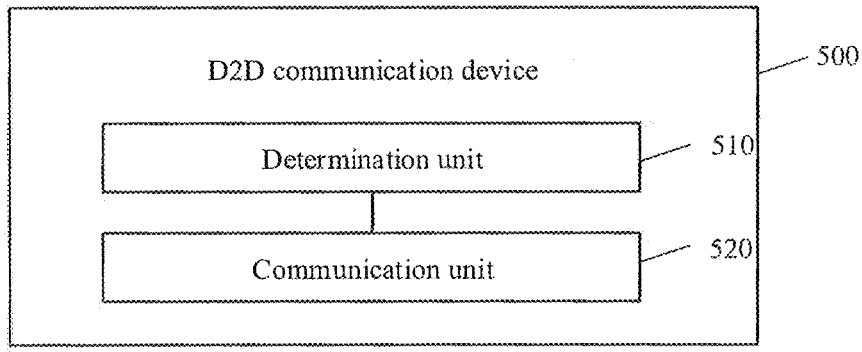
FIG. 6

METHOD AND DEVICE FOR INTER-DEVICE COMMUNICATION

CROSS-REFERENCE TO RELATED APPLICATION

The present application is the U.S. national phase of PCT Application PCT/CN2016/080803 filed on Apr. 29, 2016, the disclosure of which is incorporated herein by reference in its entirety.

TECHNICAL FIELD

The disclosure relates to the field of communications, and more particularly to a method and device for Device-to-Device (D2D) communication.

BACKGROUND

Along with development of the communication technology, the inter-device communication technologies, for example, the D2D communication technology and the Vehicle to Vehicle (V2V) technology, have become a hot area for development of wireless communication technologies.

At present, without coordination of a cellular network (for example, an existing V2V communication technology, or, a network device coverage-free D2D communication technology), resources may only be scheduled in a manner of, for example, Listen-Before-Talk (LBT), to avoid resource confliction. However, such a scheduling manner is relatively low in efficiency. Along with increase of the number of terminals, the probability of transmission collisions between the terminals is increased, the communication time delay may be gradually prolonged, and the transmission success rate may be gradually decreased, thereby bringing serious influence to D2D communication efficiency and reliability.

Therefore, it is expected to provide a technology capable of improving efficiency and reliability of the D2D communication.

SUMMARY

The disclosure provides a method and device for D2D communication, which can improve efficiency and reliability of the D2D communication.

On a first aspect, a method for D2D communication is provided, which may include the following operations. A first terminal device is determined to be a central terminal device of a first group. The first group may include the central terminal device and at least one member terminal device. The first terminal device allocates a first radio resource to a second terminal device to enable the second terminal device to perform D2D communication with the first radio resource. The second terminal device may be a member terminal device in the first group.

In combination with the first aspect, in a first implementation mode of the first aspect, the operation that the first terminal device is determined to be the central terminal device of the first group may include the following actions. The first terminal device generates a first sequence. The first terminal device transmits first indication information indicative of the first, sequence and device information of the first terminal device. One piece of device information may be configured to uniquely indicate one terminal device. The first terminal device receives at least one piece of second indication information, the at least one piece of second indication information corresponding to at least one third terminal device one to one and each piece of second indication information being indicative of a second sequence generated by a corresponding third terminal device and device information of the corresponding third terminal device. When a relationship between the first sequence and the second sequence meets a preset condition, the first terminal device determines the first terminal device to be the central terminal device of the first group.

In combination with the first aspect and the abovementioned implementation mode thereof, in a second implementation mode of the first aspect, the method may further include that, when the relationship between the first sequence and the second sequence meets the preset condition, the first terminal device determines that the third terminal device is a member terminal device of the first group.

In combination with the first aspect and the abovementioned implementation modes thereof, in a third implementation mode of the first aspect, the method may further include the following operations. The first terminal device transmits a first sounding signal to enable the third terminal device, after determining that a signal strength of the received first sounding signal is higher than or equal to a first preset strength, to transmit the second indication information or to enable the third terminal device, after determining that a distance between the first terminal device and the second terminal device determined based on the received first sounding signal is smaller than or equal to a first preset distance, to transmit the second indication information.

In combination with the first aspect and the above mentioned implementation modes thereof, in a fourth implementation mode of the first aspect, the operation that the first terminal device transmits the first indication information may include the following actions. The first terminal device receives a second sounding signal, the second sounding signal being transmitted by the third terminal device. After determining that signal strength of the received second sounding signal is higher than or equal to the first preset strength, the first terminal device transmits the first indication information. Or, the first terminal device determines a distance between the first terminal device and the third terminal device based on the received second sounding signal and, after determining that the distance between the first terminal device and the third terminal device is smaller than or equal to the first preset distance, transmits the first indication information.

In combination with the first aspect and the abovementioned implementation modes thereof, in a fifth implementation mode of the first aspect, the second sequence may be determined by the third terminal device according to the device information of the third terminal device, and the operation that the first terminal device generates the first sequence may include that, the first terminal device generates the first sequence according to device information of the first terminal device.

In combination with the first aspect and the abovementioned implementation modes thereof, in a sixth implementation mode of the first aspect, before the operation that the first terminal device determines the first terminal device to be the central terminal device of the first group, the method may further include that, when the relationship between the first sequence and the second sequence meets the preset condition, the first terminal device transmits third indication information indicating that the first terminal device requests to be the central terminal device.

In combination with the first aspect and the abovementioned implementation modes thereof, in a seventh implementation mode, the operation that the first terminal device determines the first terminal device to be the central terminal device of the first group may include the following actions. The first terminal device receives fourth indication information indicating that the third terminal device allows the first terminal device to be the central terminal device of the first group and the fourth indication information being transmitted by the third terminal device responsive to determination of the relationship between the first sequence and the second sequence meeting the preset condition. The first terminal device determines the first terminal device to be the central terminal device of the first group according to the fourth indication information, and determines that the third terminal device is a member terminal device.

In combination with the first aspect and the abovementioned implementation modes thereof, in an eighth implementation mode of the first aspect, the fourth indication information may further be configured to indicate the first sequence.

In combination with the first aspect and the abovementioned implementation modes thereof, in a ninth implementation mode of the first aspect, the operation that the first terminal device determines the first terminal device to be the central terminal device of the first group may include that, responsive to determination of fifth indication information not being received within a preset time period T after transmitting the third indication information, the first terminal device determines the first terminal device to be the central terminal device of the first group, and determines that the third terminal device is the member terminal device. The fifth indication information may be configured to indicate that the third terminal device does not allow the first terminal device to be the central terminal device of the first group.

In combination with the first aspect and the abovementioned implementation modes thereof, in a tenth implementation mode of the first aspect, the method may further include that, when the fifth indication information is received after the preset time period T, the first terminal device determines that the third terminal device does not belong to the first group.

In combination with the first aspect and the abovementioned implementation modes thereof, in an eleventh implementation mode of the first aspect, before the operation that the first terminal device determines the first terminal device to be the central terminal device of the first group, the method may further include that, responsive to determination of the fifth indication information being received within the preset time period T after transmitting the third indication information, the first terminal device retransmits the first indication information. The fifth indication information may be configured to indicate that the third terminal device does not allow the first terminal device to be the central terminal device of the first group.

In combination with the first aspect and the abovementioned implementation modes thereof, in a twelfth implementation mode of the first aspect, the fifth indication information may be transmitted by the third terminal device after determining that the first indication information is received in error, and the fifth indication information may further be configured to indicate a mistakenly received part in the first indication information.

In combination with the first aspect and the implementation modes thereof, in a thirteenth implementation mode of the first aspect, the method may further include the following actions. The first terminal device allocates an intra-group Identifier (ID) to each terminal device in the first group. An intra-group ID may be configured to uniquely indicate one terminal device in the first group. The first terminal device transmits sixth indication information indicative of the intra-group IDs of the terminal devices in the first group, to enable the terminal devices in the first group to perform D2D communication based on the intra-group IDs.

In combination with the first aspect and the abovementioned implementation modes thereof, in a fourteenth implementation mode of the first aspect, the method may further include the following operations. The first terminal device determines a group ID of the first group. A group ID may be configured to indicate an device group. The first terminal device periodically transmits a first group broadcast signal, the first group broadcast signal carrying the group ID of the first group and the device information of the first terminal device.

In combination with the first aspect and the abovementioned implementation modes thereof, in a fifteenth implementation mode of the first aspect, the method may further include the following operations. The first terminal device detects at least one second group broadcast signal, the at least one second group broadcast signal corresponding to at least one second group one to one, each second group broadcast signal being periodically transmitted by central terminal device of the corresponding second group and each second group broadcast signal carrying a group ID of the corresponding second group and device information of the central terminal device of the corresponding second group. Responsive to determination of the group ID of the second group being the same as the group ID of the first group, the first terminal device changes the group ID of the first group. Or, responsive to determination of the group ID of the second group being the same as the group ID of the first group, the first terminal device transmits ninth indication information indicating, to the central terminal device of the second group, changing the group ID of the second group.

In combination with the first aspect and the abovementioned implementation modes thereof, in a sixteenth implementation mode of the first aspect, the method may further include the following operations. The first terminal device receives a first request Message from a fourth terminal device. The first request message carries device information of the fourth terminal device, the first request message indicates that the fourth terminal device requests to join the first group. The first request message is transmitted by the second terminal device after determining that signal strength of the received first group broadcast signal is higher than or equal to second preset strength, or, the first request message is transmitted by the second terminal device after determining that a distance, determined based on the received first group broadcast signal, between the first terminal device and the fourth terminal device is smaller than or equal to a second preset distance. The first terminal device determines that the fourth terminal device is a member terminal device of the first group according to the first request message.

In combination with the first aspect and the abovementioned implementation modes thereof, in a seventeenth implementation mode of the first aspect, the method may further include the following operations. The first terminal device receives a second request message from a fifth terminal device in the first group, the fifth terminal device being member terminal device of the first group. The second request message indicates that the fifth terminal device requests to exit from the first group. The second request message is transmitted by the fifth terminal device after determining that the signal strength of the received first group broadcast signal is lower than the second preset strength, or, the second request message is transmitted by the fifth terminal device after determining that a distance between the first terminal device and the fifth terminal device determined based on the received first group broadcast signal is larger than the second preset distance. The first terminal device determines that the fifth terminal device is not a member terminal device of the first group according to the second request message.

In combination with the first aspect and the abovementioned implementation modes thereof, in an eighteenth implementation mode of the first aspect, the method may further include the following operations. The first terminal device detects a heartbeat signal from a sixth terminal device, which is a member terminal device of the first group, the heartbeat signal carrying device information of the sixth terminal device and the heartbeat signal being transmitted by the sixth terminal device according to a period which is preset or configured by the first terminal device after determining to be a member terminal device of the first group. Responsive to determination of the heartbeat signal not being received within a preset duration, the first terminal device determines that the sixth terminal device is no more member terminal device of the first group. The preset duration may be larger than or equal to a duration of the preset period. The sixth terminal device may stop transmitting the heartbeat signal after determining that the signal strength of the received first group broadcast signal is lower than the second preset strength, or, the sixth terminal device may stop transmitting the heartbeat signal after determining that a distance, determined based on the received first group broadcast signal, between the first terminal device and the sixth terminal device is larger than the second preset distance.

In combination with the first aspect and the abovementioned implementation modes thereof, in a nineteenth implementation mode of the first aspect, the first radio resource may specifically be configured for the second terminal device to transmit first data to a seventh terminal device in the first group.

In combination with the first aspect and the abovementioned implementation modes thereof, in a twentieth implementation mode of the first aspect, the method may further include that, the first terminal device transmits indication information about the first radio resource to the seventh terminal device.

In combination with the first aspect and the abovementioned implementation modes thereof, in a twenty-first implementation mode of the first aspect, the method may further include that, the first terminal device transmits tenth indication information to the seventh terminal device. The tenth indication information indicates, to the seventh terminal device, transmitting a sounding signal.

In combination with the first aspect and the abovementioned implementation modes thereof, in a twenty-second implementation mode of the first aspect, the method may further include that, the first terminal device allocates a second radio resource to the seventh terminal device to enable the seventh terminal device to transmit feedback information for the first data through the second radio resource.

In combination with the first aspect and the abovementioned implementation modes thereof, in a twenty-third implementation mode of the first aspect, the method may further include the following operations. The first terminal device receives a third group broadcast signal, the third group broadcast signal being periodically transmitted by central terminal device of a third group and the third group broadcast signal carrying a group ID of the third group and device information of the central terminal device of the third group. The first terminal device performs communication with the central terminal device of the third group according to the third group broadcast signal to determine terminal device included in the third group and enable the central terminal device of the third group to learn about the terminal device included in the first group.

In combination with the first aspect and the abovementioned implementation modes thereof, in a twenty-fourth implementation mode of the first aspect, the method may further include the following operations. The first terminal device receives second data from the second terminal device with the first radio resource. The second data is to be transmitted to an eighth terminal device and the eighth terminal device belonging to the third group. The first terminal device determines a third radio resource, the third radio resource being allocated to the first terminal device by the central terminal device of the third group. The first terminal device transmits the second data to the central terminal device of the third group or the eighth terminal device with the third radio resource.

In combination with the first aspect and the implementation modes thereof, in a twenty-fifth implementation mode of the first aspect, the method may further include the following operations. The first terminal device receives third data from the central terminal device of the third group with a fourth radio resource. The fourth radio resource is allocated by the central terminal device of the third group and the third data is to be transmitted to the second terminal device. The first terminal device transmits the third data to the second terminal device with the first radio resource.

In combination with the first aspect and the abovementioned implementation modes thereof, in a twenty-sixth implementation mode of the first aspect, the method may further include that, the first terminal device receives fourth data from the second terminal device with the first radio resource. The fourth data is to be transmitted to a network device. The first terminal device transmits the fourth data to the network device.

In combination with the first aspect and the abovementioned implementation modes thereof, in a twenty-seventh implementation mode of the first aspect, the method may further include that, the first terminal device receives fifth data from the network device, the fifth data is to be transmitted to the second terminal device; and the first terminal device transmits the fifth data to the second terminal device with the first radio resource.

In combination with the first aspect and the abovementioned implementation modes thereof, in a twenty-eighth implementation mode of the first aspect, the method may further include the following operations. The first terminal device transmits a third request message. The third request message indicates that the first terminal device requests to change the central terminal device of the first group. The first terminal device receives a fourth, request message transmitted by ninth terminal device, which a member terminal device of the first group. The fourth request message indicates that the ninth terminal device requests to be the central terminal device of the first group and the fourth request message being transmitted by the ninth terminal device according to the third request message. The first terminal device determines the ninth terminal device to be the central terminal device of the first group according to the fourth request message.

In combination with the first aspect and the abovementioned implementation modes thereof, in a twenty-ninth implementation mode of the first aspect, before the operation that the first terminal device transmits the third request message, the method may further include that, the first terminal device determines that a current state of charge is lower than or equal to a preset threshold value; or the first terminal device determines that distances between the member terminal devices in the first group meet a preset condition; or a communication connection between the first terminal device and the network device is interrupted.

On a second aspect, a method for D2D communication is provided, which may include the following operations. A second terminal device is determined to be a member terminal device of a first group. The first group may include central terminal device and at least one member terminal device. The second terminal device performs D2D communication through a first radio resource allocated by the central terminal device of the first group.

In combination with the second aspect, in a first implementation mode of the second aspect, the operation that the second terminal device is determined to be the member terminal device of the first group may include the following actions. The second terminal device generates a second sequence. The second terminal device transmits second indication information indicative of the second sequence and device information of the second terminal device. One piece of device information may be configured to uniquely indicate one terminal device. The second terminal device receives first indication information indicative of a first sequence generated by first terminal device and device information of the first terminal device. When a relationship between the first sequence and the second sequence meets a preset condition, the second terminal device determines the second terminal device as the member terminal device of the first group.

In combination with the second aspect and the abovementioned implementation mode thereof, in a second implementation mode of the second aspect, the method may further include that, when the relationship between the first sequence and the second sequence meets the preset condition, the second terminal device determines the first terminal device to be the central terminal device of the first group.

In combination with the second aspect and the abovementioned implementation modes thereof, in a third implementation mode of the second aspect, the method may further include that, the second terminal device transmits a second sounding signal to enable the first terminal device to transmit the first indication information after determining that signal strength of the received second sounding signal is higher than or equal to first preset strength or enable the first terminal device to transmit the first indication information after determining that a distance, determined based on the received second sounding signal, between the first terminal device and the second terminal device is smaller than or equal to a first preset distance.

In combination with the second aspect and the abovementioned implementation modes thereof, in a fourth implementation mode of the second aspect, the operation that the second terminal device transmits the second indication information may include the following actions. The second terminal device receives a first sounding signal, the first sounding signal being transmitted by the first terminal device. After determining that signal strength of the received first sounding signal is higher than or equal to the first preset strength, the second terminal device transmits the second indication information. Or, the second terminal device determines the distance between the first terminal device and the second terminal device based on the received first sounding signal and, after determining that the distance between the first terminal device and the second terminal device is smaller than or equal to the first preset distance, transmits the second indication information.

In combination with the second aspect and the abovementioned implementation modes thereof, in a fifth implementation mode of the second aspect, the first sequence may be determined by the first terminal device according to the device information of the first terminal device, and the operation that the second terminal device generates the second sequence may include that, the second terminal device generates the second sequence according to the device information of the second terminal device.

In combination with the second aspect and the abovementioned implementation modes thereof, in a sixth implementation mode of the second aspect, before the operation that the second terminal device determines the second terminal device to be the member terminal device of the first group. The method may further include that, the second terminal device receives third indication information from the first terminal device, the third indication information indicating that the first terminal device requests to be the central terminal device.

In combination with the second aspect and the abovementioned implementation mode thereof in a seventh implementation mode of the second aspect, the method may further include that, responsive to determination of the relationship between the first sequence and the second sequence meeting the preset condition, the second terminal device transmits fourth indication information indicating that the second terminal device allows the first terminal device to be the central terminal device of the first group.

In combination with the second aspect and the abovementioned implementation modes thereof in an eighth implementation mode of the second aspect, the method may further include the following operations. The second terminal device receives sixth indication information from the first terminal device, the sixth indication information being indicative of an intra-group ID allocated to the second terminal device by the first terminal device. The operation that the second terminal device performs D2D communication with the first radio resource allocated by the central terminal device of the first group may include that, the second terminal device performs D2D communication based on the Ultra-group ID with the first radio resource allocated by the central terminal device of the first group.

In combination with the second aspect and the abovementioned implementation modes thereof, in a ninth implementation mode of the second aspect, the method may further include that, the second terminal device receives a first group broadcast signal periodically transmitted by the first terminal device. The first group broadcast signal carries a group ID of the first group and the device information of the first terminal device. The group ID of the first group may be determined by the first terminal device, and a group ID may be configured to indicate a device group.

In combination with the second aspect and the abovementioned implementation modes thereof, in a tenth implementation mode of the second aspect, before the operation that the second terminal device is determined to be the member terminal device of the first group. The method may further include that, after determining that signal strength of the received first group broadcast signal is higher than or equal to second preset strength, the second terminal device transmits a first request message to the first terminal device.

Or after determining that the distance between the first terminal device and the second terminal device determined based on the received first group broadcast signal is smaller than or equal to a second preset distance, the second terminal device transmits the first request message to the first terminal device. The first request message may contain the device information of the second terminal device, and the first request message may be configured to indicate that the second terminal device requests to join the first group.

In combination with the second aspect and the above-mentioned implementation modes thereof, in an eleventh implementation mode of the second aspect, the method may further include that, after determining that the signal strength of the received first group broadcast signal is lower than the second preset strength, or, after determining that the distance, determined based on the received first group broadcast signal, between the first terminal device and the second terminal device is larger than the second preset distance, the second terminal device transmits a second request message to the first terminal device. The second request message indicates that the second member terminal device requests to exit from the first group.

In combination with the second aspect and the above-mentioned implementation modes thereof, in a twelfth implementation mode of the second aspect, the method may further include the following operations. The second terminal device determined to be the member terminal device of the first group transmits a heartbeat signal to the first terminal device at a preset interval. After determining that the signal strength of the received first group broadcast signal is lower than the second preset strength, the second terminal device stops transmitting the heartbeat signal. Or, after determining that the distance between the first terminal device and the second terminal device determined based on the received first group broadcast signal is larger than the second preset distance, the second terminal device stops transmitting the heartbeat signal.

In combination with the second aspect and the above-mentioned implementation modes thereof, in a thirteenth implementation mode of the second aspect, the operation that the second terminal device performs D2D communication with the first radio resource allocated by the central terminal device of the first group may include that, the second terminal device transmits first data to a seventh terminal device in the first group with the first radio resource.

In combination with the second aspect and the above-mentioned implementation modes thereof, in a fourteenth implementation mode of the second aspect, the operation that the second terminal device performs D2D communication with the first radio resource allocated by the central terminal device of the first group may include that, the second terminal device transmits second data to the first terminal device with the first radio resource. The second data may be data required to be transmitted to an eighth terminal device, and the eighth terminal device may belong to a third group.

In combination with the second aspect and the above-mentioned implementation modes thereof, in a fifteenth implementation mode of the second aspect, the operation that the second terminal device performs D2D communication with the first radio resource allocated by the central terminal device of the first group may include that, the second terminal device receives third data from the first terminal device with the first radio resource. The third data may be third data transmitted to the first terminal device by central terminal device of the third group through a fourth radio resource, and the fourth radio resource may be allocated by the central terminal device of the third group.

In combination with the second aspect and the above-mentioned implementation modes thereof, in a sixteenth implementation mode of the second aspect, the method may further include that, the second terminal device receives the third data from the central terminal device of the third group through the fourth radio resource. The fourth radio resource is allocated by the central terminal device of the third group.

In combination with the second aspect and the above-mentioned implementation modes thereof, in a seventeenth implementation mode of the second aspect, the operation that the second terminal device performs D2D communication with the first radio resource allocated by the central terminal device of the first group may include that, the second terminal device transmits fourth data to the first terminal device with the first radio resource. The fourth data is to be transmitted to a network device.

In combination with the second aspect and the above-mentioned implementation modes thereof, in an eighteenth implementation mode of the second aspect, the operation that the second terminal device performs D2D communication with the first radio resource allocated by the central terminal device of the first group may include that, the second terminal device receives fifth data from the first terminal device with the first radio resource. The fifth data has been transmitted to the first terminal device by a network device.

In combination with the second aspect and the above-mentioned implementation modes thereof, in a nineteenth implementation mode of the second aspect, the method may further include the following operations. The second terminal device receives a third request message from the first terminal device. The third request message indicates that the first terminal device requests to change the central terminal device of the first group. The second terminal device transmits a fourth request message to the first terminal device according to the third request message. The fourth request message indicates that the second terminal device requests to be the central terminal device of the first group.

On a third aspect, a device for D2D communication is provided, which includes units or modules configured to implement the first aspect and each implementation mode of the first aspect.

On a fourth aspect, a device for D2D communication is provided, which includes units or modules configured to implement the second aspect and each implementation mode of the second aspect.

On a fifth aspect, a computer program product is provided, which includes a computer program code, wherein the computer program code is run by a receiving unit, processing unit and transmitting unit or receiver, processor and transmitter of terminal device to enable the terminal device to execute any method for D2D communication in the first aspect and each implementation mode thereof.

On a sixth aspect, a computer program product is provided, which includes a computer program code, wherein the computer program code is run by a receiving unit, processing unit and transmitting unit or receiver, processor and sender of terminal device to enable the terminal device to execute any method for D2D communication in the second aspect and each implementation mode thereof.

On a seventh aspect, a computer-readable storage medium is provided, which stores a program, wherein the program enables a User Device (UE) to execute any method for D2D communication in the first aspect and each implementation mode thereof.

On an eighth aspect, a computer-readable storage medium is provided, which stores a program, wherein the program enables a UE to execute any method for D2D communication in the second aspect and each implementation mode thereof.

According to the method and device for D2D communication provided in the embodiments of the disclosure, at least two terminal devices negotiate to determine a central terminal device and one or more member terminal devices in a group, and then the central terminal device in the group may allocate a radio resource for D2D communication with the member terminal device(s) in the group, so that resource scheduling may be implemented even without coordination of a cellular network (for example, an existing V2V communication technology, or, a network device coverage-free D2D communication technology). Therefore, the problem of collision caused by resource sharing may be solved effectively, the D2D communication success rate may be increased, the communication time delay may be reduced, the D2D communication capacity may be expanded, and efficiency and reliability of the D2D communication may be improved.

BRIEF DESCRIPTION OF DRAWINGS

In order to describe the technical solutions of the embodiments of the disclosure more clearly, the drawings required to be used in the embodiments of the disclosure will be simply introduced below. It is apparent that the drawings described below are only some embodiments of the disclosure. Other drawings may further be obtained by those of ordinary skilled in the art according to these drawings without creative work.

FIG. 1 illustrates a schematic diagram of an example of a communication system in which a method and device for D2D communication of the embodiments of the disclosure are applied.

FIG. 2 illustrates a schematic flowchart of a method for D2D communication according to an embodiment of the disclosure.

FIG. 4 illustrates a schematic flowchart of a method for D2D communication according to another embodiment of the disclosure.

FIG. 5 illustrates a schematic block diagram of a device for D2D communication according to an embodiment of the disclosure.

FIG. 6 illustrates a schematic block diagram of a device for D2D communication according to another embodiment of the disclosure.

DETAILED DESCRIPTION

Figure 3:
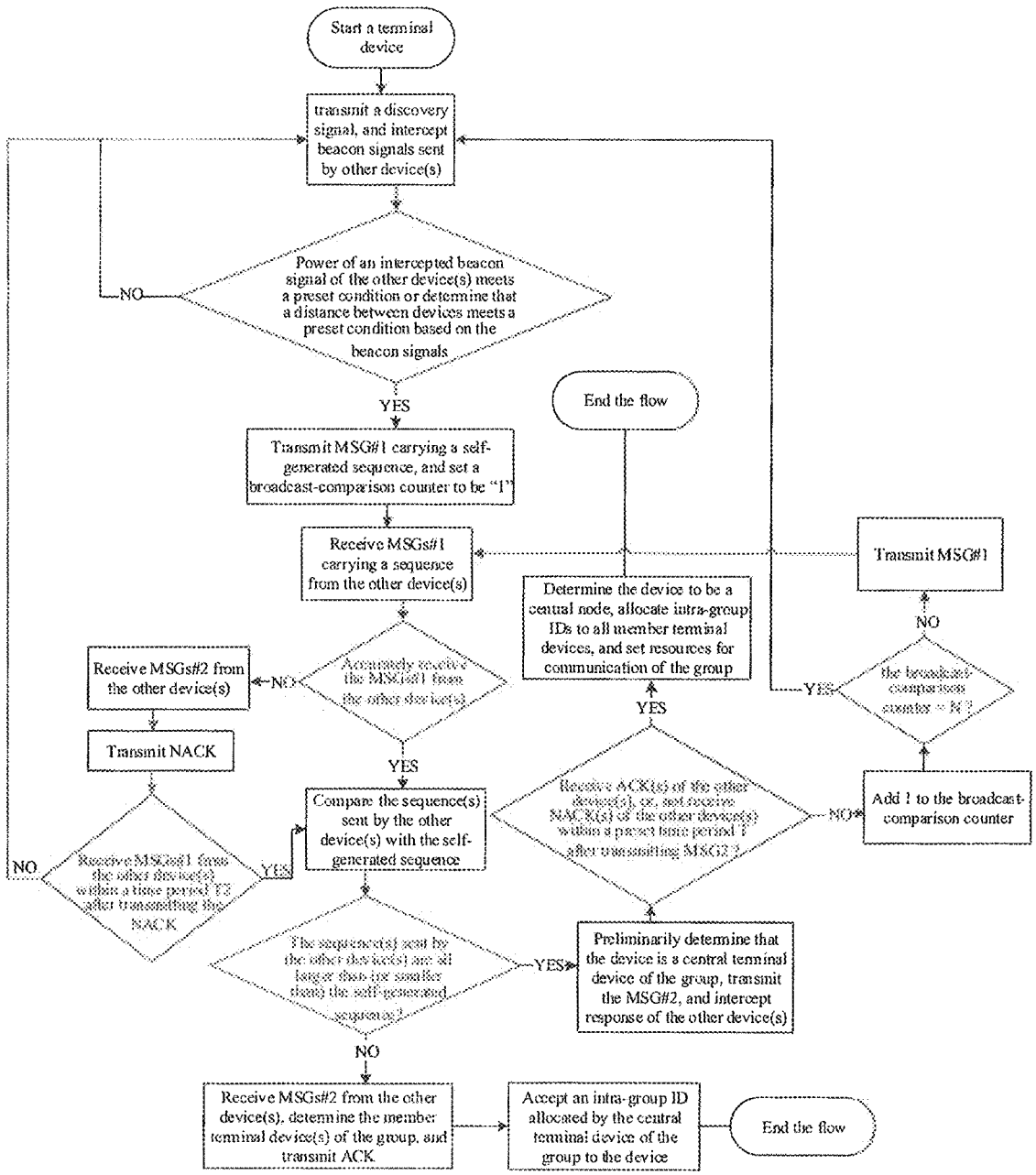
FIG. 3 illustrates a schematic chart of a process of determining a central terminal device according to an embodiment of the disclosure.

The technical solutions in the embodiments of the disclosure will be clearly and completely described below in combination with the drawings in the embodiments of the disclosure. It is apparent that the described embodiments are not all embodiments but part of embodiments of the disclosure. All other embodiments obtained by those of ordinary skilled in the art based on the embodiments in the disclosure without creative work shall fall within the scope of protection of the disclosure.

Terms "part", "module", "system" and the like mentioned in the description are used to represent a computer related entity, hardware, firmware, hardware and software combination, software or software in execution. For example, a part may be, but not limited to, a process running in a processor, the processor, an object, an executable file, an execution thread, a program and/or a computer. The drawings show that an application running in computing device and the computing device may both be parts. One or more parts may reside in a process or an execution thread, and the parts may be located in a computer and/or distributed between two or more computers. In addition, these parts may be executed from various computer-readable media with various data structures stored thereon. The "parts" may communicate through local or remote processes according to, for example, signals with one or more data groups (for example, data from two parts interacting with another part of a local system, a distributed system or a network, for example, the Internet interacting with another system through signals).

Each aspect or characteristic of the disclosure may be implemented into a method, a device or a product programed with a standard and/or using an engineering technology. Term "product" used in the application covers a computer program which may be accessed from any computer-readable device, carrier or medium. For example, the computer-readable medium may include, but not limited to: a magnetic storage device (for example, a hard disk, a floppy disk or a magnetic tape), an optical disk (for example, a Compact Disk (CD) and a Digital Versatile Disk (DVD)), a smart card and a flash memory (for example, an Erasable Programmable Read-Only Memory (EPROM), a card, a stick or a key driver). In addition, various storage media described in the disclosure may represent one or more devices and/or other machine-readable media configured to store information. Term "machine-readable medium" may include, but not limited to, a wireless channel and various other media capable of storing, including and/or carrying instructions and/or data.

The solutions of the embodiments of the disclosure may be applied to an existing cellular communication system, for example, systems of a Global System for Mobile Communication (GSM), Wideband Code Division Multiple Access (WCDMA) and Long Term Evolution (LTE), and supported communication mainly includes voice and data communication. Connections supported by a conventional base station are usually limited in number and also easy to implement.

A next-generation mobile communication system will not only support conventional communication but also support Machine to Machine (M2M) communication, or called as Machine Type Communication (MTC). It is predicted that, by 2020, MTC devices connected to networks will reach 500 to 1,000 hundred million, which will be far larger than an existing connection number. M2M services have greatly different network requirements due to their greatly different service types. There may roughly be the following requirements: reliable transmission but insensitivity to delays, and low delays and high-reliability transmission.

It is easier to process a reliable transmission delay-insensitive service. However, a service of a low-delay and highly-reliable transmission type not only requires a short transmission delay but also requires reliability, for example, a V2V service or a Vehicle to Everything (V2X) service.

Unreliable transmission may cause retransmission and an excessively long transmission delay and may not meet the requirements. The solutions according to the embodiments of the disclosure may effectively solve the problem about transmission reliability.

The terminal device may be a UE.

Each embodiment of the disclosure is described in combination with the terminal device. The terminal device may also be called a UE, a mobile station, an access terminal, a user unit, a user station, a mobile radio station, a remote station, a remote terminal, a mobile device, a user terminal, a terminal, wireless communication device, a user agent, a user device or the like. The terminal device may be an station in a Wireless Local Area Network (WLAN), or may be a cell phone, a cordless phone, a Session Initiation Protocol (SIP) phone, a Wireless Local Loop (WLL) station, a Personal Digital Assistant (PDA), handheld device with a wireless communication function, computing device, other processing device connected to a wireless modem, vehicle-mounted device, wearable device, a mobile station in a future 5th-Generation (5G) network, terminal device in a future evolved Public Land Mobile Network (PLMN) or the like.

In addition, in the embodiments of the disclosure, the terminal device may further include other devices, for example, a relay, capable of performing data communication with access network device (for example, a base station).

Moreover, in the embodiments of the disclosure, the access network device may be device configured to communicate with the mobile station. The access network device may be device, for example, a base station, configured to communicate with the mobile device, and the network device may be an Access Point (AP) in the WLAN, a Base Transceiver Station (BTS) in a Global System for Mobile Communication (GSM) or Code Division Multiple Access (CDMA), may also be a NodeB (NB) in WCDMA, and may further be an Evolutional Node B (eNB or eNodeB) in LTE, or a relay station or AR or vehicle-mounted device, wearable device, access network device in the future 5G network, access network device in the future evolved PLMN or the like.

FIG. 1 illustrates a schematic diagram of a communication system in which a method and device for D2D communication of the embodiments of the disclosure are applied. As illustrated in FIG. 1, the communication system 100 includes at least two terminal devices, for example, a terminal device 110 and a terminal device 120 in FIG. 1. The terminal device 110 and the terminal device 120 may be, for example, cell phones, smart phones, portable computers, handheld communication devices, handheld computing devices, satellite radio devices, global positioning systems, PDAs and/or any other proper devices configured for communication in the wireless communication system 100.

At a given time, the terminal device 110 and the terminal device 120 may be a wireless communication transmitting device and/or a wireless communication receiving device. When there is data to be transmitted, the wireless communication transmitting device may encode the data for transmission. Specifically, the wireless communication transmitting device may acquire (for example, generation, receiving from another communication device or storage in a memory) a certain number of data bits to be transmitted to the wireless communication receiving device through a channel. The data bits may be included in a transmission block (or multiple transmission blocks) of the data, and the transmission block may be segmented to generate multiple code blocks.

It should be understood that the number of the terminal devices, listed above, included in the communication system 100 is only exemplarily described and not intended to limit the disclosure and the number of the terminal devices included in the communication system 100 may also be any integer more than 1.

In addition, the communication system 100 may be a PLMN or a D2D network or an M2M network or a V2V network or a V2X network or another network. FIG. 1 is only a simplified schematic diagram listed as an example, and the network may further include other network devices not drawn in FIG. 1. For example, the communication system 100 may further include an access network device (not) illustrated in FIG. 1).

The access network device may include multiple antennae. In addition, the access network device may additionally include a sender chain and a receiver chain. Those of ordinary skilled in the art may understand that each of them may include multiple parts (for example, a processor, a modulator, a multiplexer, a demodulator, a demultiplexer or an antenna) related to signal transmitting and receiving.

The access network device may communicate with multiple terminal devices (for example, the terminal device 110 and the terminal device 120). However, it can be understood that the access network device may communicate with any number of terminal devices like the terminal device 110 or 120.

In addition, the access network device may be configured with multiple antennae. Moreover, for example, the access network device may, via an antenna, transmit information to the terminal device 110 through a forward link and receive information from the terminal device 110 through a reverse link. Moreover, the access network device may further, via another antenna, transmit information to the terminal device 120 through the forward link and receive information from the terminal device 120 through the reverse link.

For example, in a Frequency Division Duplex (FDD) system, the forward link and reverse link used by the same terminal device may be in different frequency bands.

For another example, in a Time Division Duplex (TDD) system and a full duplex system, the forward link and the reverse link used by the same terminal device may be in a common frequency band.

Each antenna (or an antenna group formed by multiple antennae) and/or region, designed for communication, of the access network device are/is called sectors/a sector of the access network device. For example, the antenna group may be designed to communicate with terminal device in a sector of coverage area of the access network device. In a process that the access network device communicates with the terminal device through the forward links 1 respectively, a transmitting antenna of the access network device may use beamforming to improve a signal noise ratio of the forward link. In addition, compared with a manner that the access network device transmits signals to all its terminal device through a single antenna, when the access network device transmits signals to the terminal device randomly scattered in the related coverage area by virtue of beamforming, mobile device in an adjacent cell may be interfered less.

At a given time, the access network device may be a wireless communication transmitting device and/or a wireless communication receiving device. When there is data to be transmitted, the wireless communication transmitting device may encode the data for transmission. Specifically, the wireless communication transmitting device may acquire (for example, generation, receiving from another communication device or storage in a memory) a certain number of data bits to be transmitted to the wireless communication receiving device through a channel. The data bits may be included in a transmission block (or multiple transmission blocks) of the data, and the transmission block may be segmented to generate multiple code blocks.

Frequency-domain resources for D2D communication in the embodiments of the disclosure will be described below.

Alternatively, in the embodiments of the disclosure, the terminal device may use unlicensed spectrum resources (or, unlicensed frequency bands) for wireless communication (for example, transmitting uplink information or transmitting downlink information), that is, the communication system 100 of the embodiments of the disclosure is a communication system capable of using the unlicensed frequency bands. Exemplarily but unlimitedly, the communication system 100 may adopt an Unlicensed-Assisted Access Using LTE (LAA-LTE) technology, or, may also adopt a technology supporting independent deployment of the communication system in the unlicensed frequency bands, for example, Standalone LTE over unlicensed spectrum, or, may further adopt an LTE Advanced in Unlicensed Spectrums (LTE-U) technology. For example, the communication system 100 may independently deploy an LTE system in the unlicensed frequency bands and further complete communication by adopting an LTE air interface protocol on the unlicensed frequency bands, and the system includes no licensed frequency band. The LTE system deployed in the unlicensed frequency bands may use a technology of centralized scheduling, interference coordination, Hybrid Automatic Repeat Request (HARQ) and the like, and compared with an access technology of Wireless Fidelity (Wi-Fi), the technology has higher robustness and may achieve higher spectral efficiency and provide wider coverage and a better user experience.

An unlicensed spectrum resource means a resource, which may be shared by communication devices without allocation of the system, in the unlicensed spectrum. Resource sharing on the unlicensed frequency bands means only specifying limits to indexes such as transmitted power and out-of-band leakage in terms of use of a specific spectrum to ensure that a basic coexistence requirement of multiple devices sharing the frequency band is met. An operator may achieve a purpose of network capacity offloading by use of unlicensed frequency band resources, but is required to comply with regulatory requirements of different regions and different spectrums on the unlicensed frequency band resources. These requirements are usually made to protect public systems such as radar and ensure no detrimental impact and fair coexistence between multiple systems as much as possible, and include transmitted power limits, out-of-band leakage index and indoor and outdoor use limits, some additional coexistence strategies in some regions, and the like. For example, each communication device may use spectrum resources in a contention manner or an interception manner, for example, a manner specified by LBT.

Exemplarily but unlimitedly, in the embodiments of the disclosure, the unlicensed spectrum resources may include an approximately 900 MHz frequency band nearby 5 GHz and an approximately 90 MHz frequency band nearby a 2.4 GHz frequency band.

In addition, in the embodiments of the disclosure, the terminal device may further use licensed spectrum resources for wireless communication, that is, the communication system 100 of the embodiments of the disclosure is a communication system capable of using licensed frequency bands.

A licensed spectrum resource is usually a spectrum resource which may be used only after being examined and approved by the national or local wireless communication commissions. Different systems, for example, an LTE system and a Wi-Fi system, or, systems of different operating systems may not share licensed spectrum resources.

For example, in an LTE system, multiple cells may simultaneously operate on the same frequency on a carrier, and the terms "carrier" and "cell" may be considered to be equivalent. For example, in a Carrier Aggregation (CA) scenario, when a primary carrier and a secondary carrier are configured for UEs, carrier indexes of the carriers and cell IDs of cells operating on the carriers may also be contained, and under this condition, the terms "carrier" and "cell" may be considered to be equivalent. For example, for a terminal device, access to a carrier and access to a cell are equivalent. That is, in the descriptions of the embodiments of the disclosure, "cell" may also be replaced with "carrier".

FIG. 2 illustrates a schematic flowchart of a method for D2D communication 200 described in the view angle of a central terminal device according to an embodiment of the disclosure.

As illustrated in FIG. 2, the method 200 includes the following operations.

In S210, first terminal device is determined to be a central terminal device of a first group. The first group includes the central terminal device and at least one member terminal device.

In S220, the first terminal device allocates a first radio resource to a second terminal device, to enable the second terminal device to perform D2D communication with the first radio resource. The second terminal device is a member terminal device of the first group.

In the embodiment of the disclosure, multiple (at least two) terminal devices may negotiate to determine a group and determine a central terminal device and member terminal devices of the group. For convenience of understanding and description, descriptions will be generally made with a negotiation process between a terminal device A (i.e., an example of the first terminal device) and a terminal device B (i.e., an example of the second terminal device or third terminal device) as an example.

FIG. 3 illustrates a schematic chart of a process of determining a central terminal device according to an embodiment of the disclosure. As illustrated in FIG. 3, in the embodiment of the disclosure, a process for determining a group may include a discovery process.

Alternatively, the method further includes the following operations. A first terminal device transmits a first sounding signal, to enable a third terminal device, after determining that a signal strength of the received first sounding signal is higher than or equal to a first preset strength, to transmit second indication information, or to enable the third terminal device, after determining that a distance between the first terminal device and the second terminal device determined based on the received first sounding signal is smaller than or equal to a first preset distance, to transmit the second indication information.

Alternatively, the operation that the first terminal device transmits first indication information may include that, the first terminal device receives a second sounding signal from the third terminal device.

Further, after determining that a signal strength of the received second sounding signal is higher than or equal to the first preset strength, the first terminal device transmits the first indication information, Or, the first terminal device determines a distance between the first terminal device and the third terminal device based on the received second sounding signal, and transmits the first indication information after determining that the distance between the first terminal device and the third terminal device is smaller than or equal to the first preset distance.

Specifically, in the embodiment of the disclosure, a terminal device (for example, the terminal device A and the terminal device B) which has not join any group may transmit a discovery signal (which may also be called a sounding signal) in a specified format on a specified frequency-domain resource (recorded hereinafter as a frequency-domain resource 1 for convenience of understanding and distinction) at a preset interval (recorded hereinafter as a period T1 for convenience of understanding and distinction). In addition, exemplarily but unlimitedly, the discovery signal may be a beacon signal. Moreover, when not transmitting the discovery signal, the terminal device which has not join any group may intercept a discovery signal, i.e., a beacon signal, transmitted by other terminal devices which have not join any group on the frequency-domain resource 1. Therefore, the terminal devices which have not join any group may discover each other based on the discovery signals and execute a subsequent process for establishing a group (which will subsequently be described in detail).

Alternatively, in the embodiment of the disclosure, the period T1 may dynamically be changed. For example, the time period T1 may be prolonged or shortened by a specified step with each pass of a specified duration.

In addition, in the embodiment of the disclosure, a change range of the period T1 may be specified, that is, the period T1 may dynamically be changed within the specified range.

Alternatively, in the embodiment of the disclosure, the discovery signal may carry indication information about a position of the terminal device. Moreover, exemplarily but unlimitedly, in the embodiment of the disclosure, each terminal device may be positioned through a satellite positioning system, for example, a Global Positioning System (GPS), and thereby the indication information about the position of the terminal device is determined.

Without loss of generality, descriptions will be made with the following case as an example, i.e., the terminal device A determines whether to execute the subsequent process for establishing a group based on a discovery signal B received from the terminal device B.

Therefore, the terminal device A may transmit a discovery signal (i.e., an example of the first sounding signal, recorded hereinafter as a discovery signal A for convenience of understanding and distinction) in the abovementioned manner, and the terminal device B may transmit a discovery signal (i.e., an example of the second sounding signal, recorded hereinafter as a discovery signal B for convenience of understanding and distinction) in the abovementioned manner. Furthermore, when the terminal device A is within coverage of the terminal device B, the terminal device A may receive the discovery signal B.

Alternatively, if the terminal device A determines that a signal strength of the discovery signal B is higher than or equal to a preset power threshold value (recorded hereinafter as $P_{proximity}$ for convenience of understanding), the terminal device A may determine that the terminal device A and the second terminal device B may establish a group and execute the subsequent process for establishing a group. In addition, alternatively, after the terminal device A determines that the signal strength of the discovery signal B is higher than or equal to $P_{proximity}$, the terminal device A may further determine whether a duration for which the signal strength of the discovery signal B is higher than or equal to $P_{proximity}$ exceeds a preset duration threshold value (recorded hereinafter as $T_{proximity}$ for convenience of understanding), and if YES, the terminal device A may determine that the terminal device A and the terminal device B may set up the group and execute the subsequent process for establishing a group.

Or, alternatively, the terminal device A may determine a distance between the terminal device A and the terminal device B based on the discovery signal B. For example, when the discovery signal B carries indication information about a position of the terminal device B, the terminal device A may determine the position of the terminal device B according to the indication information, a position of the terminal device A may be determined based on the GPS technology and the like, and the terminal device A may further determine the distance between the terminal device A and the terminal device B. Or, a mapping relationship between various signal strengths and various distance values may be determined, so that the terminal device A may find the distance value corresponding to the signal strength of the discovery signal B from the mapping relationship according to the signal strength of the discovery signal B, and take it to be the distance between the terminal device A and the terminal device B. If the terminal device A determines that the distance between the terminal device A and the terminal device B is smaller than or equal to a preset distance threshold value (recorded hereinafter as $D_{proximity}$ for convenience of understanding), the terminal device A may determine that the terminal device A and the terminal device B may set up the group and execute the subsequent process for establishing a group. In addition, alternatively, after the terminal device A determines that the distance between the terminal device A and the terminal device B is smaller than or equal to $D_{proximity}$, the terminal device A may further determine whether a duration for which the distance between the terminal device A and the terminal device B is smaller than or equal to $D_{proximity}$ exceeds $T_{proximity}$, and if YES, the terminal device A may determine that the terminal device A and the terminal device B may set up the group and execute the subsequent process for establishing a group.

Similarly, the terminal device B may determine whether to execute the subsequent process for establishing a group according to the discovery signal A.

By the abovementioned discovery process, each member terminal device in the formed group may be positioned within coverage of the central terminal device, and it can be ensured that the central terminal device is able to make schedules over each member terminal device, so that reliability of the method for D2D communication of the disclosure may further be improved.

It should be understood that the above process for establishing a group which includes the discovery process is only an example, the process for establishing a group may not include the discovery process. Moreover, the specific operations included in the discovery process listed above are only exemplarily described and may be appropriately changed according to a practical condition. For example, the subsequent process for establishing a group may be directly executed after the discovery signal is received, and there is no need to determine whether a related condition of a time threshold value is met.

In the embodiment of the disclosure, the process for determining a group may include a process for determining a central terminal device as follows.

Alternatively, the operation that the first terminal device is determined to be the central terminal device of the first group includes the following actions.

The first terminal device generates a first sequence.

The first terminal device transmits the first indication information indicative of the first sequence and device information of the first terminal device. One piece of device information is uniquely indicative of one terminal device.

The first terminal device receives at least one piece of second indication information. The at least one piece of second indication information corresponds to at least one third terminal device one to one. Each piece of second indication information indicates a second sequence generated by a corresponding third terminal device and device information of the corresponding third terminal device.

When a relationship between the first sequence and the second sequence meets a preset condition, the first terminal device determines the first terminal device to be the central terminal device of the first group.

Moreover, alternatively, the method further includes that, when the relationship between the first sequence and the second sequence meets the preset condition, the first terminal device determines that the third terminal device is a member terminal device of the first group.

Specifically, in the embodiment of the disclosure, each terminal device (for example, the terminal device A and the terminal device B) may generate a sequence in a specified format. The "specified format" may be specified by a communication protocol.

Or, the "specified format" may be preset in each terminal device by a manufacturer when the terminal device is delivered.

Or, the "specified format" may be transmitted to each terminal device by a telecommunication operator.

Or, the "specified format" may be input to the terminal device by a user.

Or, the "specified format" may further be determined by a format of a beacon signal received by the terminal device from other (one or more) terminals, for example, a format of a beacon signal corresponds to a format of a sequence. It is important to note that, when beacon signals received by the terminal device from multiple other terminal devices are in different formats, the terminal device may determine the "specified format" according to the beacon format used by the most number of terminal device.

It should be understood that the above process for determining a specified format is only exemplarily described and is not specially limited in the disclosure. As long as a format of a sequence generated by each terminal device corresponds to each other, the sequences may be compared to determine whether the preset condition is met.

Exemplarily but unlimitedly, the sequence may be a character string of a system (for example, binary, octal, decimal or hexadecimal) specified by the "specified format".

Or, the sequence may be a random number within a numerical range specified by the "specified format".

Or, the sequence may be a unique ID (for example, device information and mobile phone number), specified by the "specified format" and preconfigured in the terminal device, of the terminal device, or, a numerical value corresponding to the unique ID.

Moreover, the above specific forms of the specified format are only exemplarily described and are not specially limited in the disclosure. As long as each terminal device may compare the sequences, it can be determined whether the preset condition is met.

Alternatively, the operation that the first terminal device generates the first sequence includes that, the first terminal device generates the first sequence according to device information of the first terminal device.

Specifically, since device information of terminal device is unique, in the embodiment of the disclosure, a sequence of the terminal device is generated according to the device information of the terminal device.

Exemplarily but unlimitedly, a character string or numerical value of the device information of the terminal device may be determined to be the sequence of the terminal device.

In the embodiment of the disclosure, the device information of the terminal device may be a device ID (for example, the mobile phone number) of the terminal device, or, the device information of the terminal device may be the numerical value or character string determined based on the device ID of the terminal device. For example, the device information of the terminal device may be generated by encryption processing and the like on the device ID of the terminal device. Descriptions about the same or similar condition will be omitted below.

It should be understood that the above process that the terminal device determines the sequence according to the device information is only exemplarily described and not intended to limit the disclosure. For example, the terminal device may also substitute the device information (for example, the numerical value corresponding to the device information) into a specified mathematical model (for example, formula) for calculation and determine a calculation result to be the sequence generated by the terminal device.

Then, each terminal device (for example, the terminal device A and the terminal device B) may encapsulate the generated sequence and the device information of the terminal device (the device ID of the terminal device or the numerical value corresponding to the device ID of the terminal device) into a message (recorded hereinafter as an MSG #1 for convenience of understanding and description) receivable and recognizable for the other terminal devices, and exemplarily but unlimitedly, the MSG #1 may be a broadcast message, that is, all the other terminal devices within signal coverage of the terminal device may receive the MSG #1 from the terminal device. Therefore, the other terminal devices may determine which terminal device the MSG #1 is from (i.e., the terminal device indicated by the device information) according to the device information (the device ID of the terminal device or the numerical value corresponding to the device ID of the terminal device) carried in the MSG #1.

It should be understood that the above parameter "device information of the terminal device" is only exemplarily described and not specially limited in the disclosure and other parameters, information capable of enabling the terminal devices to recognize which terminal device a certain broadcast message is from shall fall within the scope of protection of the "device information of the terminal device" of the disclosure. Descriptions about the same or similar condition will be omitted below.

In addition, exemplarily but unlimitedly, the MSG #1 may be formed by the terminal device through adding a specific message header (or an operation code "OP-Code"), a Cyclic Redundancy Code (CRC) and the like to the sequence (or the sequence and the device information).

Then, each terminal device may transmit the generated MSG #1 on a specified frequency-domain resource (recorded hereinafter as a frequency-domain resource 2 for convenience of understanding and distinction). It is important to note that the frequency-domain resource 2 may be the same as or different from the frequency-domain resource 1, which is not specially limited in the disclosure. Descriptions about the same or similar condition will be omitted below.

Moreover, exemplarily or unlimitedly, when terminal device transmits an MSG #1 for the first time in a process for establishing a group, a value of a broadcast-comparison counter may be set to be "1".

Therefore, the terminal device A may generate a sequence A (i.e., an example of the first sequence) in the abovementioned manner. Moreover, the terminal device A may generate and transmit an MSG #1 (recorded hereinafter as an MSG #1A for convenience of understanding and distinction) (i.e., an example of the first indication information) carrying the sequence A and device information (recorded hereinafter as device information A for convenience of understanding and distinction) capable of uniquely indicating the terminal device A.

Similarly, the terminal device B may generate a sequence B (i.e., an example of the second sequence) in the abovementioned manner. Mreover, the terminal device B may generate and transmit an MSG #1 (recorded hereinafter as an MSG #1B for convenience of understanding and distinction) (i.e., an example of the second indication information) carrying the sequence B and device information (recorded hereinafter as device information B for convenience of understanding and distinction) capable of uniquely indicating the terminal device B.

Without loss of generality, the process for determining a central device will be described below in detail with the following process as an example, i.e., the terminal device A determines a central device of the group based on a relationship between the generated sequence A and the sequence B carried in the MSG #1B received from the terminal device B.

That is, the terminal device A may compare the sequence A with the sequence B to judge whether the relationship between the sequence A and the sequence B meets a preset condition and determine the central terminal device of the group (recorded hereinafter as a group #1 for convenience of understanding and distinction) including the terminal device A and the terminal device B according to a judgment result.

Exemplarily but unlimitedly, the "preset condition" may be that the terminal device determines the terminal device that the sequence with a largest numerical value among the generated sequence and the received sequences is from to be the central terminal device of the group.

Or, the "preset condition" may be that, the terminal device determines the terminal device that the sequence with a smallest numerical value among the generated sequence and the received sequences is from to be the central terminal device of the group.

Or, the "preset condition" may be that, the terminal device ranks the generated sequence and the received sequences according to a preset rule (for example, according to a sequence from large to small or from small to large numerical values) and determines the terminal device that the sequence at a specified position (for example, the first or the last) is from to be the central terminal device of the group.

In addition, exemplarily but unlimitedly, each terminal device may further determine the terminal devices that sequences other than the sequence meeting the "preset condition" are from to be member terminal devices of the group.

In the embodiment of the disclosure, the "preset condition" may be specified by the communication protocol.

Or, the "preset condition" may be preset in each terminal device by the manufacturer when the terminal device is delivered.

Or, the "preset condition" may be transmitted to each terminal device by the telecommunication operator.

Or, the "preset condition" may be input to the terminal device by the user.

It should be understood that the above process for determining a preset condition is only exemplarily described and is not specially limited in the disclosure. Moreover, the preset rule used by each terminal device may be the same or may be different from each other, which is not specially limited in the disclosure, as long as the terminal devices may determine a same central terminal device based on the fixed multiple sequences.

Alternatively, in the embodiment of the disclosure, one ten final device, after determining that the generated sequence meets the preset condition, may directly determine the terminal device as the central terminal device of the group. Moreover, the terminal device may determine the terminal devices that the received sequences are from to be member devices of the group.

Or, in the embodiment of the disclosure, after determining the generated sequence meets the preset condition, each terminal device may further negotiate with the other terminal devices as follows.

Alternatively, if the MSG #1 does not contain any device ID (for example, the device information is the numerical value generated based on the device ID), the terminal devices may negotiate to determine the terminal device indicated by each piece of device information. Therefore, in a subsequent communication process, the terminal device that the message is from may be determined according to the device information, and wireless communication reliability may further be improved.

Moreover, alternatively, before the operation that the first terminal device determines the first terminal device to be the central terminal device of the first group, the method further includes that, when the relationship between the first sequence and the second sequence meets the preset condition, the first terminal device transmits third indication information indicating that the first terminal device requests to be the central terminal device.

Specifically, after one terminal device (for example, the first terminal device) determines that a relationship between the generated sequence and the received sequences meets the preset condition (for example, the numerical value of the generated sequence is larger than the numerical value of each received sequence), the first terminal device may transmit a message (i.e., an example of the third indication information, recorded hereinafter as an MSG #2 for convenience of understanding and description) for requesting to be a central terminal device of a group (i.e., a group formed by the terminal devices that the sequences compared by the first terminal device are from, for example, group #1).

Exemplarily but unlimitedly, the MSG #2 may be a broadcast message, that is, all the other terminal devices (including the third terminal device) within the signal coverage of the terminal device may receive the MSG #2.

In addition, alternatively, in the embodiment of the disclosure, the MSG #2 may contain the device information of the terminal device (for example, the first terminal device) that it is from, so that the other terminal devices (for example, the third terminal device) may determine the terminal device that the MSG #2 is from according to the device information contained in the MSG #2.

Or, alternatively, in the embodiment of the disclosure, the MSG #2 may contain the sequence generated by the terminal device (for example, the first terminal device) that it is from, so that the other terminal devices (for example, the third terminal device) may determine the terminal device that the MSG #2 is from according to the sequence contained in the MSG #2 and based on a corresponding relationship between device information and a sequence in the received MSG #1.

Then, the terminal device (for example, the first terminal device) may transmit the generated MSG #2 on a specified frequency-domain resource (recorded hereinafter as a frequency-domain resource 3 for convenience of understanding and distinction). It is important to note that the frequency-domain resource 3 may be the same as or different from the frequency-domain resource 2. Moreover, the frequency-domain resource 3 may be the same as or different from the frequency-domain resource 1, which will not be specially limited in the disclosure. Descriptions about the same or similar condition will be omitted below to avoid elaborations.

Then, the terminal device (for example, the first terminal device) may determine a response condition of the other terminal devices for the MSG #2 and perform subsequent processing of determining the central device of the group according to the response condition.

Exemplarily but unlimitedly, the response conditions for the MSG #2 may include the following conditions.

Condition A: a response indicating that another terminal device (for example, the third terminal device or the second terminal device) allows the first terminal device to be the central terminal device of the group is received.

condition B: a response indicating that the terminal device (for example, the third terminal device or the second terminal device) does not allow the first terminal device to be the central terminal device of the group is received within a specified time period (i.e., a preset time period T).

Condition C: the response indicating that the terminal device (for example, the third terminal device or the second terminal device) does not allow the first terminal device to be the central terminal device of the group is not received within the specified time period (i.e., the preset time period T).

For convenience of understanding and description, a processing process under the abovementioned conditions will be described below in detail by taking the following as an example, i.e., the terminal device A and the terminal device B determine the terminal device A to be the central terminal device of the group #1 according to the sequence A and the sequence B based on the preset condition.
Condition A The operation that the first terminal device determines the first terminal device to be the central terminal device of the first group includes that the following actions.

The first terminal device receives fourth indication information indicating that the third terminal device allows the first terminal device to be the central terminal device of the first group. The fourth indication information is transmitted by the third terminal device responsive to determination of the relationship between the first sequence and the second sequence meeting the preset condition.

The first terminal device determines the first terminal device to be the central terminal device of the first group according to the fourth indication information, and determines that the third terminal device is the member terminal device.

Specifically, the terminal device A (for example, an example of the first terminal device) may generate and transmit MSG #2 (recorded hereinafter as an MSG #2A for convenience of understanding and distinction) in the abovementioned manner after determining that the relationship between the sequence A and the sequence B meets the preset condition.

After the terminal device B (for example, an example of the second terminal device or the third terminal device) determines that the relationship between the sequence A and the sequence B meets the preset condition, if the MSG #2A is received and, for example, the device information (or sequence) contained in the MSG #1A and device information (or sequence) contained in the MSG #2A correspond to the same terminal device (i.e., the terminal device A), the terminal device B may generate and transmit, on a specified frequency-domain resource (recorded hereinafter as a frequency-domain resource 4 for convenience of understanding and distinction) an Acknowledgement (ACK) message (i.e., an example of the fourth indication information) for the MSG #2A, where the ACK message may include ACK information indicating that the terminal device (i.e., the terminal device A) transmitting the MSG #2A is allowed to be the central terminal device of the group #1.

Exemplarily but unlimitedly, the ACK message may be a broadcast message, that is, all the other terminal device (including the terminal device A) within signal coverage of the terminal device B (i.e., an example of the second terminal device or the third terminal device) may receive the ACK message.

In addition, alternatively, in the embodiment of the disclosure, the ACK message may contain the device information of the terminal device B (i.e., an example of the second terminal device or the third terminal device), so that the terminal device A may determine the terminal device B that the ACK message is from according to the device information contained in the ACK message. Moreover, the terminal device A may determine that the terminal device B may be a member terminal device of the group #1.

Or, alternatively, in the embodiment of the disclosure, the ACK message may contain the sequence (i.e., the sequence B) generated by the terminal device B (i.e., an example of the second terminal device or the third terminal device), so that the terminal device A may determine that the ACK message is from the terminal device B according to the sequence B contained in the ACK message based on a corresponding relationship between the sequence B determined by the MSG #2B and the device information of the terminal device B. Moreover, the terminal device A may determine that the terminal device B may be the member terminal device of the group #1.

Alternatively, the fourth indication information may further be configured to indicate the first sequence.

Specifically, in the embodiment of the disclosure, the ACK message may contain the sequence (i.e., the sequence A) generated by the terminal device A, so that the terminal device A may determine that the ACK message is a response for the MSG #2A according to the sequence A contained in the ACK message.

Therefore, the reliability of the D2D communication of the disclosure may further be improved.

It should be understood that the above manner of responding to the MSG #2A after the terminal device B determines that the relationship between the sequence A and the sequence B meets the preset condition is only exemplarily described and not intended to limit the disclosure. For example, the terminal device B may transmit no response message, and under this condition, if the terminal device A does not receive any response message (including an ACK response message and a Negative Acknowledgement (NACK) response message) within the preset time period T, the terminal device A may determine that the terminal device B allows the terminal device A to be the central terminal device of the group #1.

Condition B

Before the operation that the first terminal device determines the first terminal device to be the central terminal device of the first group, the method further includes that, responsive to determination of fifth indication information being received within the preset time period T after transmitting the third indication information, the first terminal device retransmits the first indication information. The fifth indication information indicates that the third terminal device does not allow the first terminal device to be the central terminal device of the first group.

Specifically, the terminal device A may generate and transmit the MSG #2A in the abovementioned manner after determining that the relationship between the sequence A and the sequence B meets the preset condition.

When the terminal device B does not accurately receive the MSG #1A (for example, the MSG #1A received by the terminal device B is incomplete or fails to pass CRC) and thus may not determine whether the relationship between the sequence A and the sequence B meets the preset condition, if the MSG #2A is received, the NACK message (i.e., an example of the fifth indication information) for the MSG #2A may be generated and transmitted. The NACK message may include NACK information indicating that the terminal device (i.e., the terminal device A) transmitting the MSG #2A is not allowed to be the central terminal device of the group #1.

Exemplarily but unlimitedly, the NACK message may be a broadcast message, that is, all the other terminal devices (including the terminal device A) within the signal coverage of the terminal device B (i.e., an example of the second terminal device or the third terminal device) may receive the NACK message.

In addition, alternatively, in the embodiment of the disclosure, the NACK message may contain the device information or sequence B of the terminal device B (i.e., an example of the second terminal device or the third terminal device), so that the terminal device A may determine the terminal device B that the NACK message is from according to the device information or sequence B contained in the NACK message.

Alternatively, the fifth indication information may further be configured to indicate the first sequence.

Specifically, in the embodiment of the disclosure, the NACK message may contain the sequence (i.e., the sequence A) generated by the terminal device A, so that the terminal device A may determine that the NACK message is a response for the MSG #2A according to the sequence A contained in the NACK message.

In the embodiment of the disclosure, the terminal device A further determines a moment when the NACK message is received, and if the moment is within the preset time period T after the terminal device transmits the MSG #2A, the terminal device A may determine not to be the central terminal device of the group #1 and determines that the terminal device B is not the member terminal device of the group #1.

It is important to note that, in the embodiment of the disclosure, the "preset time period T" may be specified by the communication protocol.

Or, the "preset time period T" may be preset in each terminal device by the manufacturer when the terminal device is delivered.

Or, the "preset time period T" may be transmitted to each terminal device by the telecommunication operator.

Or, the "preset time period T" may be input to the terminal device by the user. Then, the terminal device A may retransmit the MSG #1A.

Alternatively, the fifth indication information is transmitted by the third terminal device after determining that the first indication information is received in error; and the fifth indication information may further be configured to indicate a part, received in error, of the first indication information.

Specifically, the NACK message may further include a part, received in error, in the MSG #1A received by the terminal device B. Moreover, exemplarily but unlimitedly, the part received in error may be a content determined by the terminal device B based on, for example, CRC, and failing to pass CRC, or, the received in error may be a bit(s) corresponding to a missing content in the MSG #1A.

Therefore, the terminal device A may retransmit a part corresponding to the received in error in the MSG #1A according to the NACK message, so as to reduce the resource overhead.

It is important to note that, in the embodiment of the disclosure, the case that the terminal device B may not accurately receive the MSG #1A for many times and thus the NACK message is required to be transmitted for many times may occur and, correspondingly, the terminal device A may retransmit the MSG #1A (all bits of the MSG #1A or part of bits of the MSG #1A) for many times. In this case, the terminal device A may add 1 to the broadcast-comparison counter every time when retransmitting the MSG #1A. Moreover, when a numerical value of the broadcast-comparison counter reaches a preset threshold value "N", the terminal A determines that this process for establishing a group fails. Alternatively, the terminal device A may retransmit the discovery signal.

Correspondingly, if the terminal device B correctly receives the MSG #1A retransmitted by the terminal device A within a specified time period (recorded hereinafter as a time period T2 for convenience of understanding and distinction) after the NACK message is transmitted, the terminal device B retransmits the MSG #1B and re-executes a comparison process on the sequence A and the sequence B.

If the terminal B does not receive the MSG #1A retransmitted by the terminal device A within the time period T2, the terminal device B may determine that this process for establishing a group fails. Alternatively, the terminal device B may retransmit the discovery signal.

Condition C

Alternatively, the operation that the first terminal device determines the first terminal device to be the central terminal device of the first group includes that, responsive to determination of the fifth indication information not being received within a preset time period T after the third indication information is transmitted, the first terminal device determines the first terminal device to be the central terminal device of the first group, and determines that the third terminal device is a member terminal device. The fifth indication information indicates that the third terminal device does not allow the first terminal device to be the central terminal device of the first group.

Specifically, the terminal device A may start a timer after transmitting the MSG #2A, a moment when the timer expires is the same as an ending moment of the preset time period T. Moreover, if the terminal device A has not received a NACK message from the other terminal device (for example, the terminal device B) before the timer expires, or, if the terminal device A does not receive the NACK message within the preset time period T, the terminal device A may determine as a default that the other terminal device (for example, the terminal device B) allows the terminal device A to be the central terminal device of the group #1 and determine the other terminal device (for example, the terminal device B) to be a member terminal device of the group #1.

Alternatively, the method further includes that, when the fifth indication information is received after the preset time period T, the first terminal device determines that the third terminal device does not belong to the first group.

Specifically, if the terminal device A receives the NACK message from the other terminal device (for example, the terminal device B) after the timer expires, or, if the terminal device A receives the NACK message after the preset time period, the terminal device A may still be determined to be the central terminal device of the group #1 and determine that the terminal device (for example, the terminal device B) transmitting the NACK message is not a member terminal device of the group #1. For example, the terminal device B may be removed from a group member list of the group #1.

It should be understood that the above process of determining the central terminal device and the member terminal device is only exemplarily described and not intended to limit the disclosure.

For example, if both the terminal device B and the terminal device A do not correctly receive the MSGs #1 from each other, after the terminal device B transmits the NACK message, both the terminal device B and the terminal A may retransmit the MSGs #1, and if a re-comparison result is that the terminal device B is the central terminal device (that is, the relationship between the newly received sequence B and the sequence A indicates that the terminal device B is the central terminal device), the terminal device B may execute a subsequent flow as same as the flow described above and executed by the terminal device A when determining that the terminal device A is the central terminal device based on the relationship between the sequence B and the sequence A. Detailed descriptions will be omitted herein to avoid elaborations.

For another example, a terminal device (recorded hereinafter as terminal device C for convenience of understanding and distinction) not transmitting any ACK message or NACK message may not serve as a member terminal device of the group #1. Moreover, the terminal device C may retransmit and intercept a discovery signal.

For another example, if the terminal device A does not receive the ACK message or NACK message from the terminal device C, the terminal device A may determine that the terminal device C is not a member terminal device of the group #1. Moreover, the terminal device C may retransmit and intercept the discovery signal.

Functions of the central terminal device in the embodiment of the disclosure will be described below in detail.

For convenience of understanding and description, the functions of the central terminal device will be described below in detail by taking the following condition as an example, i.e., the terminal device A serves as the central terminal device of the group #1 and the terminal device B is the member terminal device of the group #1.

Exemplarily but unlimitedly, in the embodiment of the disclosure, the central terminal device may have the following functions.

1: a group ID is maintained and broadcast.

Namely, the method alternatively further includes the following operations.

The first terminal device determines a group ID of the first group. One group ID is uniquely indicative of one device group.

The first terminal device periodically transmits a first group broadcast signal, the first group broadcast signal carrying the group ID of the first group and the device information of the first terminal device.

Specifically, the terminal device A (i.e., an example of the first terminal device) may generate a group ID (recorded hereinafter as a group ID #1 for convenience of understanding and distinction) indicating the group #1.

In the embodiment of the disclosure, the group ID may have a specific format, that is, a terminal device in a communication system may take information in the specific format as a group ID. The format of the group ID may be specified by the communication protocol, or may be preset in each terminal device by the manufacturer when the terminal device is delivered, or may be transmitted to each terminal device by the telecommunication operator, or may be input to the terminal device by the user, as long as each terminal device may recognize the group ID. The format of the group ID is not limited in the disclosure.

Exemplarily but unlimitedly, for example, the terminal device A may randomly select an ID from multiple IDs (or, sequences or random numbers) acquired in a manner of specifying based on the communication protocol and the like to be the group ID #1. It should be understood that the above group ID generation method is only exemplarily described and is not specially limited in the disclosure. For example, the terminal device A may further determine the group ID #1 according to the device information of the terminal device A. For example, the terminal device A may substitute the device information (or the numerical value corresponding to the device information) into the mathematical model (for example, formula) for calculation and determine a calculation result to be the group ID #1.

Then, the terminal device A may transmit a broadcast signal (i.e., an example of the first group broadcast signal, recorded hereinafter as a broadcast signal #1 for convenience of understanding and distinction) carrying the group ID #1. Moreover, the broadcast signal #1 may contain the device information of the terminal device A.

Therefore, the terminal device (for example, the terminal device B) executing the abovementioned negotiation process with the terminal device A may determine the group ID #1 contained in the broadcast signal #1 to be a group ID of a group (i.e., the group #1) of which a member terminal device is the terminal device A according to the device information, contained in the broadcast signal #1, of the terminal device A.

It should be understood that the above solution of carrying the device information of the terminal device A in the broadcast signal #1 is only exemplarily described and not intended to limit the disclosure.

For example, the terminal device A may contain the device information of the terminal device A in the broadcast signal #1 only when transmitting the broadcast signal #1 for the first K times (for example, for the first time), and carries no device information of the terminal device A but only the group ID #1 in the broadcast signal #1 to be transmitted subsequently.

Therefore, the member terminal device of the group #1 may determine existence of the group #1 according to the periodically transmitted broadcast signal #1.

Alternatively, the method further includes that, the first terminal device detects at least one second group broadcast signal, the at least one second group broadcast signal corresponding to at least one second group one to one, each second group broadcast signal being periodically transmitted by a central terminal device of the corresponding second group and each second group broadcast signal carrying a group ID of the corresponding second group and device information of the central terminal device of the corresponding second group.

The method further includes that, responsive to determination of the group ID of the second group being the same as the group ID of the first group, the first terminal device changes the group ID of the first group, or transmits ninth indication information indicating, to the central terminal device of the second group, changing the group ID of the second group.

Specifically, in the embodiment of the disclosure, multiple (at least two) groups may coexist in the communication system. If the central terminal device (i.e., the terminal device A) of the group #1 is within coverage of central terminal device (recorded hereinafter as terminal device D for convenience of understanding and distinction) in another group (i.e., an example of the second group, recorded hereinafter as a group #2 for convenience of understanding and distinction), the terminal device A may receive a broadcast signal (i.e., an example of the second group broadcast signal, recorded hereinafter as a broadcast signal #2 for convenience of understanding and distinction) carrying a group ID (recorded hereinafter as a group ID #2 for convenience of understanding and distinction) of the group #2 from the terminal device D.

Moreover, if the terminal device A determines that the group ID #2 is the same as the group ID #1, the terminal device A may select another group ID for the group #1 and notify the member terminal device(s) (for example, the terminal device B) of the group #1 of the new group ID for the group #1.

Or, if the terminal device A determines that the group ID #2 is the same as the group ID #1 the terminal device A may transmit a message (i.e., an example of the ninth indication information) indicating, to the terminal device D, selecting another group ID for the group #2 and cause the terminal device D to notify member terminal device(s) of the group #2 of the new group ID for the group #2.

Therefore, a communication error, caused by the same group ID used by two groups with overlapped coverage, of the member terminal devices of the groups may be avoided.

2. each member terminal device is allocated an intra-group ID.

Namely, the method alternatively further includes the following operations.

The first terminal device allocates an intra-group ID to each terminal device in the first group. An intra-group ID is uniquely indicative of one terminal device in a group.

The first terminal device transmits sixth indication information indicative of the intra-group IDs of the terminal devices in the first group, to enable the terminal devices in the first group to perform D2D communication based on the intra-group IDs.

Moreover, the terminal device A may allocate an intra-group ID to each member terminal device in the group #1 after being determined to be the central terminal device of the group #1. In a group, an intra-group ID is configured to uniquely identify a member terminal device. Therefore, the member terminal devices in the group #1 may perform D2D communication according to the intra-group IDs.

Exemplarily but unlimitedly, in the embodiment of the disclosure, the terminal device A may determine the intra-group ID of each member terminal device according to the device information of each terminal device in the group #1. For example, the terminal device may also substitute the device information (or the numerical value corresponding to the device information) of one terminal device into the specified mathematical model (for example, the formula) for calculation and determine a calculation result to be the intra-group ID of the terminal device.

In the embodiment of the disclosure, the central terminal device may allocate the intra-group ID to each member terminal device in a manner of broadcast information and the like, and the broadcast information may include the device information and the intra-group ID of each member terminal device. Moreover, each member terminal device may feedback ACK information to the central terminal device after receiving the intra-group ID.

3: time and frequency synchronization in the group is maintained.

Specifically, in the embodiment of the disclosure, the central terminal device (for example, the terminal device A) may determine a transmission resource, for example, a frequency-domain resource (for example, a carrier frequency and a frequency bandwidth), for D2D communication between the terminal devices (for example, including the member terminal device(s) and central terminal device of the group) in the group (for example, the group #1) to which the central terminal device belongs and periodically transmits a time synchronization signal. The time synchronization signal may have a specific format, that is, the terminal device may recognize the time synchronization signal according to the specific format.

Moreover, the member terminal device(s) (for example, the terminal device B) of the group may align an internal timing signal onto the time synchronization signal transmitted by the central terminal device.

4: the terminal device is controlled to join the group.

Namely, alternatively, the first terminal device receives a first request message from a fourth terminal device. The first request message carries device information of the fourth terminal device, the first request message indicates that the fourth terminal device requests to join the first group, the first request message is transmitted by the second terminal device after determining that a signal strength of the received first group broadcast signal is higher than or equal to a second preset strength, or, the first request message is transmitted by the second terminal device after determining that a distance between the first terminal device and the fourth terminal device determined based on the received first group broadcast signal is smaller than or equal to a second preset distance.

The first terminal device determines that the fourth terminal device is a member terminal device of the first group according to the first request message.

Specifically, when one terminal device (i.e., an example of the second terminal device or the fourth terminal device, recorded hereinafter as terminal device E for convenience of understanding and distinction) which has not joined any group moves into the coverage of the terminal device A, the terminal device E may receive the broadcast signal #1 from the terminal device A.

Alternatively, if the terminal device E determines that the signal strength of the broadcast signal #1 is higher than or equal to a preset power threshold value (recorded hereinafter as $W_{proximity}$ for convenience of understanding), the terminal device E may initiate a process of joining the group #1. In addition, alternatively, after the terminal device E determines that the signal strength of the broadcast signal #1 is higher than or equal to $W_{proximity}$, the terminal device E may further determine whether a duration for which the signal strength of the broadcast signal #1 is higher than or equal to $W_{proximity}$ exceeds a preset duration threshold value (recorded hereinafter as $Y_{proximity}$ for convenience of understanding), and if "YES", the terminal device E may initiate the process of joining the group #1.

Or, alternatively, the terminal device E may determine a distance between the terminal device E and the terminal device A based on the broadcast signal #1. For example, in the embodiment of the disclosure, the broadcast signal #1 may contain the indication information about the position of the terminal device A. In this case, the terminal device E may determine the position of the terminal device A according to the indication information, a position of the terminal device E may be determined based on the GPS technology and the like, and the terminal device E may further determine the distance between the terminal device E and the terminal device A. Or, a mapping relationship between various signal strengths and various distance values may be determined, so that the terminal device E may find the distance value corresponding to the signal strength of the broadcast signal #1 from the mapping relationship, and take it to be the distance between the terminal device E and the terminal device A according to the signal strength of the broadcast signal #1. If the terminal device E determines that the distance between the terminal device E and the terminal device A is smaller than or equal to a preset distance threshold value (recorded hereinafter as $X_{proximity}$ for convenience of understanding), the terminal device E may initiate the process of joining the group #1. In addition, alternatively, after the terminal device E determines that the distance between the terminal device E and the terminal device A is smaller than or equal to $X_{proximity}$, the terminal device E may further determine whether a duration for which the distance between the terminal device E and the terminal device A is smaller than or equal to $X_{proximity}$ exceeds $Y_{proximity}$ and if YES, the terminal device E may initiate the process of joining the group #1.

Exemplarily but unlimitedly, the process of joining the group #1 may include that: the terminal device E may transmit a request message (i.e., an example of the first request message, recorded hereinafter as a request message #1 for convenience of understanding and distinction) configured to request to join the group #1 to the terminal device A. In the embodiment of the disclosure, the request message #1 may contain an ID and a specific message header or operation code (configured to identify that the request message #1 is a request message, requesting to join the group, of the terminal) of the terminal device E.

In addition, alternatively, the request message #1 may further contain information indicating a reason (for example, the terminal device E needs to communicate with one or more member terminal devices in the group #1) why the terminal device E requests to join the group #1, or, information indicating an device type of the terminal device E.

Therefore, the terminal device A may receive the request message #1 and determine that the terminal device E requests to join the group #1 based on the request message #1. Then, the terminal device A may, for example, judge whether to allow the terminal device E to join the group #1 or judge whether to allow the terminal device E to be a member terminal device of the group #1 according to the number of the terminal devices included in the group #1 and the like. Moreover, the terminal device A may transmit a judgment result to the terminal device E.

5: the member terminal device is controlled to exit from the group.

For example, alternatively, the method further includes the following operations.

The first terminal device receives a second request message from a fifth terminal device in the first group. The fifth terminal device is a member terminal device of the first group. The second request message indicates that the fifth terminal device requests to exit from the first group, the second request message is transmitted by the fifth terminal device after determining that the signal strength of the received first group broadcast signal is lower than the second preset strength, or, the second request message is transmitted by the fifth terminal device after determining that a distance between the first terminal device and the fifth terminal device determined based on the received first group broadcast signal is larger than the second preset distance.

The first terminal device determines that the fifth terminal device is not a member terminal device of the first group according to the second request message.

Specifically, the member terminal device in the group #1 may receive the broadcast signal #1. Alternatively, if a certain member terminal device (for example, the terminal device B, i.e., an example of the second terminal device or the fifth terminal device) in the group #1 determines that the signal strength of the broadcast signal #1 is lower than the preset power threshold value (recorded hereinafter as $W_{proximity}$ for convenience of understanding), the terminal device B may initiate a process of exiting from the group #1. In addition, alternatively, after the terminal device B determines that the signal strength of the broadcast signal #1 is lower than $W_{proximity}$ the terminal device B may further determine whether a duration for which the signal strength of the broadcast signal #1 is lower than $W_{proximity}$ exceeds the preset duration threshold value (recorded hereinafter as $Y_{proximity}$ for convenience of understanding), and if "YES", the terminal device B may initiate the process of exiting from the group #1.

Or, alternatively, the terminal device B may determine the distance between the terminal device B and the terminal device A based on the broadcast signal #1. For example, in the embodiment of the disclosure, the broadcast signal #1 may contain the indication information about the position of the terminal device A. In this case, the terminal device B may determine the position of the terminal device A according to the indication information. The position of the terminal device B may be determined based on the GPS technology and the like. The terminal device B may further determine the distance between the terminal device B and the terminal device A. Or, a mapping relationship between various signal strengths and various distance values may be determined, so that the terminal device B may find the distance value corresponding to the signal strength of the broadcast signal #1 from the mapping relationship according to the signal strength of the broadcast signal #1 and take it to be the distance between the terminal device B and the terminal device A. If the terminal device B determines that the distance between the terminal device B and the terminal device A is larger than or equal to the preset distance threshold value (recorded hereinafter as $X_{proximity}$ for convenience of understanding), the terminal device B may initiate the process of exiting from the group #1. In addition, alternatively, after the terminal device B determines that the distance between the terminal device B and the terminal device A is larger than or equal to $X_{proximity}$ the terminal device B may further determine whether a duration for which the distance between the terminal device B and the terminal device A is larger than or equal to $X_{proximity}$ exceeds $Y_{proximity}$, and if YES, the terminal device B may initiate the process of exiting from the group #1.

Exemplarily but unlimitedly, the process of exiting from the group #1 may include that, the terminal device B may transmit a request message (i.e., an example of the second request message, recorded hereinafter as a request message #2 for convenience of understanding and distinction) configured to request to exit from the group #1 to the terminal device A. In the embodiment of the disclosure, the request message #2 may contain an ID and a specific MSG header or operation code (configured to identify that the request message #2 is a request message, requesting to exit from the group, of the terminal) of the terminal device B.

Therefore, the terminal device A may receive the request message #2 and determine that the terminal device B requests to exit from the group #1 based on the request message #2. Then, the terminal device A may delete the terminal device B from the member terminal device list of the group #1 and delete the group ID and the context of the terminal device B.

For another example, alternatively, the method further includes the following operations.

The first terminal device detects a heartbeat signal from a sixth terminal device, which is a member terminal device of the first group. The heartbeat signal carries device information of the sixth terminal device and the heartbeat signal is transmitted by the sixth terminal device according to a period which is preset or configured by the first terminal device after determining to be a member terminal device of the first group.

Responsive to determination of the heartbeat signal not being received within a preset duration, the first terminal device determines that the sixth terminal device is not a member terminal device of the first group, where the preset duration is larger than or equal to a duration of the preset period. The sixth terminal device stops transmitting the heartbeat signal after determining that the signal strength of the received first group broadcast signal is lower than the second preset strength, or, the sixth terminal device stops transmitting the heartbeat signal after determining that a distance between the first terminal device and the sixth terminal device determined based on the received first group broadcast signal is larger than the second preset distance.

Specifically, in the embodiment of the disclosure, the member terminal device in the group may generate and send, on a specified frequency-domain resource (recorded hereinafter as a frequency-domain resource 5 for convenience of understanding and distinction), a heartbeat signal, and the heartbeat signal may carry an intra-group ID or a device information of the member terminal device and a sequence number (the sequence number may be cyclic in a certain numerical range) and the like of the heartbeat signal, so that the central terminal device may manage the member terminal device in the group according to the heartbeat signal.

Without loss of generality, the terminal device B may transmit a heartbeat signal (recorded hereinafter as a heartbeat signal B for convenience of understanding and distinction) after being determined to be the member terminal device of the group #1.

Alternatively, if a certain member terminal device (for example, the terminal device B, i.e., an example of the second terminal device or the sixth terminal device) in the group #1 determines that the signal strength of the broadcast signal #1 is lower than $W_{proximity}$, the terminal device B may stop transmitting the heartbeat signal B. In addition, alternatively, after the terminal device B determines that the signal strength of the broadcast signal #1 is lower than $W_{proximity}$, the terminal device B may further determine whether the duration for which the signal strength of the broadcast signal #1 is lower than $W_{proximity}$ exceeds the preset duration threshold value $Y_{proximity}$ and if "YES", the terminal device B may stop transmitting the heartbeat signal B.

Or, alternatively, the terminal device B may determine the distance between the terminal device B and the terminal device A based on the broadcast signal #1. For example, in the embodiment of the disclosure, the broadcast signal #1 may contain the indication information about the position of the terminal device A. In this case, the terminal device B may determine the position of the terminal device A according to the indication information. The position of the terminal device B may be determined based on the GPS technology and, the like. The terminal device B may further determine the distance between the terminal device B and the terminal device A. Or, a mapping relationship between various signal strength and various distance values may be determined, so that the terminal device B may find the distance value corresponding to the signal strengths of the broadcast signal #1 from the mapping relationship according to the signal strength of the broadcast signal #1, and take it to be the distance between the terminal device B and the terminal device A. If the terminal device B determines that the distance between the terminal device B and the terminal device A is larger than or equal to the preset distance threshold value $X_{proximity}$ the terminal device B may stop transmitting the heartbeat signal B. In addition, alternatively, after the terminal device B determines that the distance between the terminal device B and the terminal device A is larger than or equal to $X_{proximity}$ the terminal device B may further determine whether the duration for which the distance between the terminal device B and the terminal device A is larger than or equal to $X_{proximity}$ exceeds $Y_{proximity}$, and if YES, the terminal device B may stop transmitting the heartbeat signal B.

In the embodiment of the disclosure, the terminal device A may configure a timer for the terminal device B and reset the timer whenever receiving the heartbeat signal B. Therefore, when the terminal device A determines that the heartbeat signal B is not received within a specified duration (i.e., the preset duration) according to the timer, the terminal device A may delete the terminal device B from the member terminal device list of the group #1 and delete the group ID and the context of the terminal device B.

6. a transmission resource for D2D communication is allocated to the terminal devices in the group.

Specifically, exemplarily but unlimitedly, the central terminal device (for example, the terminal device A) may occupy, for the group (for example, the group #1) to which the central terminal device belongs, a time-frequency resource block on a preset frequency (or, a communication channel) as a resource pool for communication between the terminal devices in the group.

It is important to note that, in the embodiment of the disclosure, the central terminal device may have a network connection, or, the central terminal device may communicate with an access network device. In this case, the central terminal device may apply to the access network device for licensed frequency-domain resources for D2D communication of the terminal devices in the group to form a resource pool for the group. Or, the central terminal device may determine unlicensed frequency-domain resources for D2D communication of the terminal devices in the group to form the resource pool for the group in a contention manner, an LBT manner or the like.

Alternatively, a size of the resource pool is variable. For example, the central terminal device may change the size of the resources included in the resource pool according to the number of the member terminal device in the group, or, the central terminal device may change the size of the resources included in the resource pool according to a size of data to be transmitted by the member terminal device in the group.

Exemplarily but unlimitedly, in the embodiment of the disclosure, the transmission resource allocated by the central terminal device to the member terminal devices, as described above, may be configured for communication between the member terminal device and the other member terminal device(s) in the same group (i.e., case α). Or, the transmission resource allocated by the central terminal device to the member terminal device(s), as described above, may be configured for communication between the member terminal device(s) and the network device (through the central terminal device) (i.e., case β). Or, the transmission resource allocated by the central terminal device to the member terminal device, as described above, may be configured for communication between the member terminal device(s) and member terminal device(s) of another group (through the central terminal device) (i.e., case γ). Actions of each device in the abovementioned cases will be described below in detail respectively.

For convenience of understanding and description, without loss of generality, the action of the central terminal device will be described below with the terminal device A as an example and the action of the member terminal device will be described below with the terminal device B as an example.

Case α

Alternatively, the first radio resource is used for the second terminal device to transmit first data to a seventh terminal device in the first group.

Specifically, for example, when the terminal device B (i.e., an example of the second terminal device) in the group #1 needs to transmit data (recorded hereinafter as data 1 for convenience of understanding and description) to one or more member terminal devices (i.e., an example of the seventh terminal device, recorded hereinafter as terminal device F for convenience of understanding and description) in the group #1, the terminal device B may transmit a resource scheduling request message (recorded hereinafter as a scheduling request message 1-1 for convenience of understanding and distinction) to the terminal device A.

Therefore, the terminal device A may determine a radio resource (for example, a time-frequency resource) (recorded hereinafter as a radio frequency 1-1 for convenience of understanding and description) configured to transmit the data 1 in the resource pool determined above according to the scheduling request message 1-1.

Exemplarily but unlimitedly, for example, a size of a resource allocated by the terminal device A may be fixed, that is, a size of the radio resource 1-1 tray be specified in advance by, for example, the communication protocol and the like.

Or, exemplarily but unlimitedly, the scheduling request message 1-1 may alternatively include indication information about a size of the data 1, so that the terminal device A may determine the radio resource 1-1 based on the size of the data 1.

Or, exemplarily but unlimitedly, the scheduling request message 1-1 may alternatively include indication information about a service type of a service to which the data 1 belongs, so that the terminal device A may determine the radio resource 1-1 based on the service type of the service to which the data 1 belongs. Exemplarily but unlimitedly, for example, if the service to which the data 1 belongs is a service to be continuously (for example, continuously in the time domain) transmitted such as a video service, the terminal device A may determine a continuous resource to be the radio resource 1-1.

After the radio resource 1-1 is determined, as described above, the terminal device A may transmit indication information about the radio resource 1-1 to the terminal device B, so that the terminal device B may transmit the data 1 through the radio resource 1-1, Exemplarily but unlimitedly, the indication information about the radio resource 1-1 may be configured to indicate a position of the radio resource 1-1 in the time domain or the frequency domain.

Alternatively, the method further includes that, the first terminal device transmits indication information about the first radio resource to the seventh terminal device.

Specifically, in the embodiment of the disclosure, the terminal device A may transmit the indication information about the radio resource 1-1 to the terminal device F, so that the terminal device F may receive the data 1 on the radio resource 1-1.

It should be understood that the manner, listed above, in which the terminal device F receives the data 1 is only exemplarily described and not intended to limit the disclosure. For example, the terminal device F may receive the data 1 in a blind detection manner. For example, the terminal device B may encapsulate device information of the terminal device F into a data packet carrying the data 1, so that the terminal device F, responsive to detection of the data packet carrying the device information of the terminal device F, may determine that the data packet carries the data (for example, the data 1) to be transmitted to the terminal device F and may further perform, for example, de-encapsulation processing on the data packet to further acquire the data 1.

Alternatively, the method further includes that, the first terminal device transmits tenth indication information to the seventh terminal device. The tenth indication information indicates, to the seventh terminal device, transmitting a sounding signal.

Specifically, in the embodiment of the disclosure, the terminal device A may further transmit a message (i.e., an example of the tenth indication information) indicating, to the terminal device F, transmitting a sounding signal to the terminal device F (i.e., an example of the seventh terminal device), so that the terminal device F may transmit the sounding signal based on an indication of the terminal device A. Furthermore, the terminal device B may perform channel estimation on a channel between the terminal device F and the terminal device B according to the sounding signal transmitted by the terminal device F to determine a transmitting parameter, for example, transmitting power, a modulation and encoding scheme, a rate matching manner or a multi-antenna technical mode and a HARQ redundancy version number, for the data 1.

Alternatively, the method further includes that, the first terminal device allocates a second radio resource to the seventh terminal device, to enable the seventh terminal device to transmit feedback information for the first data with the second radio resource.

Specifically, in the embodiment of the disclosure, the terminal device F, after receiving the data 1, may further transmit feedback information (recorded hereinafter as feedback information 1 for convenience, of understanding and distinction) for the data 1 to the terminal device B.

In this case, the terminal device F may transmit a scheduling request message (recorded hereinafter as a scheduling request message 1-2 for convenience of understanding and distinction) to the terminal device A to request the terminal device A to transmit a radio resource (recorded hereinafter as a radio resource 1-2 for convenience of understanding and distinction) for carrying the feedback information 1 to the terminal device F.

Exemplarily but unlimitedly, in the embodiment of the disclosure, the size of the resource allocated by the terminal device A may be fixed, that is, a size of the radio resource 1-2 may be specified in advance by, for example, the communication protocol.

Or, exemplarily but unlimitedly, the scheduling request message 1-2 may alternatively include an indication ID indicating that the data transmitted by the terminal device F is the feedback information, so that the terminal device A may determine the radio resource 1-2 based on the indication ID.

After the radio resource 1-2 is determined, as described above, the terminal device A may transmit indication information about the radio resource 1-2 to the terminal device F, so that the terminal device F may transmit the feedback information 1 for the data 1 with the radio resource 1-2. Exemplarily but unlimitedly, the indication information about the radio resource 1-2 may be configured to indicate a position of the radio resource 1-2 in the time domain or the frequency domain.

Alternatively, in the embodiment of the disclosure, the terminal device A may transmit the indication information about the radio resource 1-2 to the terminal device B, so that the terminal device B may receive the feedback information on the radio resource 1-2.

It should be understood that the manner, listed above, in which the terminal device B receives the feedback information 1 is only exemplarily described and not intended to limit the disclosure. For example, the terminal device B may receive the feedback information 1 in the blind detection manner. For example, the terminal device F may encapsulate the device information of the terminal device B into a data packet carrying the feedback information 1, so that the terminal device B, responsive to detection about the data packet carrying the device information of the terminal device B, may determine that the data packet carries the data (for example, the feedback information) to be transmitted to the terminal device B and may further perform, for example, de-encapsulation processing on the data packet to further acquire the feedback information 1.

Case β

The method further includes the following operations.

The first terminal device receives fourth data from the second terminal device with the first radio resource. The fourth data is to be transmitted to a network device.

The first terminal device transmits the fourth data to the network device.

Specifically, for example, if the position of the terminal device B (i.e., an example of the second terminal device) in the group #1 is out of coverage of the network device and the terminal device B needs to transmit data (i.e., an example of the fourth data, recorded hereinafter as data 2 for convenience of understanding and distinction) to the network device, the terminal device B may transmit a resource scheduling request message (recorded hereinafter as a scheduling request message 2 for convenience of understanding and distinction) to the terminal device A. Moreover, the scheduling request message 2 may contain indication information indicating that the terminal device B is to transmit the data to the network device, so that the terminal device may determine that the data (i.e., the data 2) from the terminal device B is to be transmitted to the network device according to the scheduling request message 2.

Therefore, the terminal device A may determine a radio resource (for example, a time-frequency resource) (recorded hereinafter as a radio frequency 2-1 for convenience of understanding and description) for transmitting the data 2 from the resource pool determined above according to the scheduling request message 2.

Exemplarily but unlimitedly, for example, the size of the resource allocated by the terminal device A may be fixed, that is, a size of the radio resource 2-1 may be specified in advance by, for example, the communication protocol and the like.

Or, exemplarily but unlimitedly, the scheduling request message 2 may alternatively include indication information about a size of the data 2, so that the terminal device A may determine the radio resource 2-1 based on the size of the data 2.

Or, exemplarily but unlimitedly, the scheduling request message 2 may alternatively include indication information about a service type of a service to which the data 2 belongs, so that the terminal device A may determine the radio resource 2-1 based on the service type of the service to which the data 2 belongs. Exemplarily but unlimitedly, for example, if the service to which the data 2 belongs is a service to be continuously (for example, continuously on the time domain) transmitted such as a video service, the terminal device A may determine a continuous resource as the radio resource 2-1.

After the radio resource 2 is determined, as described above, the terminal device A may transmit indication information about the radio resource 2-1 to the terminal device B, so that the terminal device B may transmit the data 2 with the radio resource 2-1. Exemplarily but unlimitedly, the indication information about the radio resource 2-1 may be configured to indicate a position of the radio resource 2 in the time domain or the frequency domain. Moreover, in the embodiment of the disclosure, the data packet transmitted by the terminal device B and carrying the data 2 may contain indication information indicating that the data 2 is to be transmitted to the network device. For example, a destination address field of the data packet carrying the data 2 may contain an address of the network device.

Therefore, the terminal device A may transmit the data 2 to the network device. Exemplarily but unlimitedly, the terminal device A may transmit the data based on a resource scheduled by the network device. Moreover, exemplarily but unlimitedly, the terminal device may transmit indication information indicating that the data 2 is from the terminal device B to the network device.

In addition, the terminal device A may further transmit a sounding signal to the terminal device B, so that the terminal device B may perform channel estimation on a channel between the terminal device A and the terminal device B according to the sounding signal transmitted by the terminal device A, to determine a transmitting parameter, for example, transmitting power, a modulation and encoding scheme, a rate matching manner or a multi-antenna technical mode and a HARQ redundancy version number, for the data 2.

Moreover, the terminal device A, after receiving the data 2, may further transmit feedback information (recorded hereinafter as feedback information 2 for convenience of understanding and distinction) for the data 2 to the terminal device B.

In this case, the terminal device A may determine a radio resource (recorded hereinafter as a radio resource 2-2 for convenience of understanding and distinction) carrying the feedback information 2.

Exemplarily but unlimitedly, in the embodiment of the disclosure, the size of the resource allocated by the terminal device A may be fixed, that is, a size of the radio resource 2-2 may be specified in advance by, for example, the communication protocol.

Or, exemplarily but unlimitedly, the terminal device A may alternatively determine the radio resource 2-2 based on the size of the feedback information 2.

After the radio resource 2-2 is determined, as described above, the terminal device A may transmit the feedback information 2 for the data 2 through the radio resource 2-2.

Alternatively, in the embodiment of the disclosure, the terminal device A may transmit indication information about the radio resource 2-2 to the terminal device B, so that the terminal device B may receive the feedback information on the radio resource 2-2.

It should be understood that the manner, listed above, in which the terminal device B receives the feedback information 2 is only exemplarily described and not intended to limit the disclosure. For example, the terminal device B may receive the feedback information 2 in the blind detection manner. For example, the terminal device A may encapsulate the device information of the terminal device B into a data packet carrying the feedback information 2, so that the terminal device B, responsive to detection of the data packet carrying the device information of the terminal device B, may determine that the data packet carries the data (for example, the feedback information 2) to be transmitted to the terminal device B and may further perform, for example, de-encapsulation processing on the data packet to further acquire the feedback information 2.

Alternatively, the method further includes the following operations.

The first terminal device receives fifth data from the network device. The fifth data is to be transmitted to the second terminal device.

The first terminal device transmits the fifth data to the second terminal device with the first radio resource.

Specifically, for example, if the position of the terminal device B (i.e., an example of the second terminal device) in the group #1 is out of the coverage of the network device and the network device is to transmit data (i.e., an example of the fifth data, recorded hereinafter as data 3 for convenience of understanding and distinction) to the terminal device B, the network device may transmit the data 3 to the terminal device A. Moreover, data carrying the data 3 may alternatively contain indication information indicating that the data 3 is to be transmitted to the terminal device B.

Therefore, the terminal device A may determine that the data 3 is to be transmitted to the terminal device B and determine a radio resource (for example, a time-frequency resource) (recorded hereinafter as a radio frequency 3-1 for convenience of understanding and description) for carrying the data 3.

Exemplarily but unlimitedly, for example, the size of the resource allocated by the terminal device A may be fixed, that is, a size of the radio resource 3-1 may be specified in advance by, for example, the communication protocol and the like.

Or, exemplarily but unlimitedly, the terminal device A may determine the radio resource 3-1 based on the size of the data 3.

Or, exemplarily but unlimitedly, the terminal device A may alternatively determine the radio resource 3-1 based on a service type of a service to which the data 3 belongs. Exemplarily but unlimitedly, for example, if the service to which the data 3 belongs is a service to be continuously (for example, continuously on the time domain) transmitted such as a video service, the terminal device A may determine a continuous resource to be the radio resource 3-1.

After the radio resource 3-1 is determined, as described above, the terminal device A may transmit the data 3 to the terminal device B with the radio resource 3-1.

Alternatively, the terminal device A may transmit indication information about the radio resource 3-1 to the terminal device B, so that the terminal device B may receive the data 3 with the radio resource 3-1. Exemplarily but unlimitedly, the indication information about the radio resource 3-1 may be configured to indicate a position of the radio resource 3-1 in the time domain or the frequency domain.

It should be understood that the manner, listed above, in which the terminal device B receives the data 3 is only exemplarily described and not intended to limit the disclosure. For example, the terminal device B may receive the data 3 in the blind detection manner. For example, the terminal device A may encapsulate the device information of the terminal device B into a data packet carrying the data 3, so that the terminal device F, responsive to detection of the data packet carrying the device information of the terminal device B, may determine that the data packet carries the data (for example, the data 3) to be transmitted to the terminal device B and may further perform, for example, de-encapsulation processing on the data packet to further acquire the data 3.

In addition, the terminal device A may further indicate, to the terminal device B, transmitting a sounding signal, so that the terminal device A may perform channel estimation on the channel between the terminal device A and the terminal device B according to the sounding signal transmitted by the terminal device B, to determine a transmitting parameter, for example, transmitting power, a modulation and encoding scheme, a rate matching manner or a multi-antenna technical mode and a HARQ redundancy version number, for the data 3.

Moreover, the terminal device B, after receiving the data 3, may further transmit feedback information (recorded hereinafter as feedback information 3 for convenience of understanding and distinction) for the data 3 to the terminal device A.

In this case, the terminal device B may transmit a scheduling request message (recorded hereinafter as a scheduling request message 3 for convenience of understanding and distinction) to the terminal device A to request the terminal device A to transmit a radio resource (recorded hereinafter as a radio resource 3-2 for convenience of understanding and distinction) for carrying the feedback information 3 to the terminal device B.

Exemplarily but unlimitedly, in the embodiment of the disclosure, the size of the resource allocated by the terminal device A may be fixed, that is, a size of the radio resource 3-2 may be specified in advance by, for example, the communication protocol.

Or, exemplarily but unlimitedly, the scheduling request message 3-2 may alternatively include an indication ID indicating that the data transmitted by the terminal device B is the feedback information, so that the terminal device A may determine the radio resource 3-2 based on the indication ID.

After the radio resource 3-2 is determined, as described above, the terminal device A may transmit indication information about the radio resource 3-2 to the terminal device B, so that the terminal device B may transmit the feedback information 3 for the data 3 with the radio resource 3-2. Exemplarily but unlimitedly, the indication information about the radio resource 3-2 may be configured to indicate a position of the radio resource 3-2 in the time domain or the frequency domain.

Case γ

Specifically, in the embodiment of the disclosure, multiple (at least two) groups may coexist in the communication system. If the central terminal device (i.e., the terminal device A) of the group #1 is within coverage of central terminal device (recorded hereinafter as terminal device G for convenience of understanding and distinction) in another group (i.e., an example of a third group, recorded hereinafter as a group #3 for convenience of understanding and distinction), the terminal device A may receive a broadcast signal (i.e., an example of the second group broadcast signal, recorded hereinafter as a broadcast signal #3 for convenience of understanding and distinction) carrying a group ID (recorded hereinafter as a group ID #3 for convenience of understanding and distinction) of the group #3 from the terminal device G.

Alternatively, if the terminal device A determines that a signal strength of the broadcast signal #3 is higher than or equal to a preset power threshold value (recorded hereinafter as $L_{proximity}$ for convenience of understanding), the terminal device A may initiate a process for information interaction with the terminal device G. In addition, alternatively, after the terminal device A determines that the signal strength of the broadcast signal #3 is higher than or equal to $L_{proximity}$, the terminal device A may further determine whether a duration for which the signal strength of the broadcast signal #3 is higher than or equal to $L_{proximity}$ exceeds a preset duration threshold value (recorded hereinafter as $R_{proximity}$ for convenience of understanding), and if YES, the terminal device A may initiate the process for information interaction with the terminal device G.

Or, alternatively, the terminal device A may determine the distance between the terminal device A and the terminal device G based on the broadcast signal #3. For example, when the broadcast signal #3 carries indication information about a position of the terminal device G, the terminal device A may determine the position of the terminal device G according to the indication information. The position of the terminal device A may be determined based on the GPS technology and the like. The terminal device A may further determine the distance between the terminal device A and the terminal device G. Or, a mapping relationship between various signal strengths and various distance values may be determined, so that the terminal device A may find the distance value corresponding to the signal strength of the broadcast signal #3 from the mapping relationship according to the signal strength of the broadcast signal #3, and take it to be the distance between the terminal device A and the terminal device G. If the terminal device A determines that the distance between the terminal device A and the terminal device G is smaller than or equal to a preset distance threshold value (recorded hereinafter as $S_{proximity}$ for convenience of understanding), the terminal device A may initiate the process for information interaction with the terminal device G. In addition, alternatively, after the terminal device A determines that the distance between the terminal device A and the terminal device G is smaller than or equal to $S_{proximity}$, the terminal device A may further determine whether a duration for which the distance between the terminal device A and the terminal device G is smaller than or equal to $S_{proximity}$ exceeds $R_{proximity}$ and if YES, the terminal device A may initiate the process for information interaction with the terminal device G.

Or, the terminal device G may judge whether to initiate the process for information interaction with the terminal device A based on the broadcast signal #1 from the terminal device A. Moreover, this judgment process is similar to a judgment process executed by the terminal device A based on the broadcast signal #3, and detailed descriptions thereof will be omitted herein to avoid elaborations.

Exemplarily but unlimitedly, the process for information interaction may be an interaction process for indication information about the terminal devices (including the central terminal device and the central terminal device) included in the group, and the following manner may be listed. For example, the terminal device A may transmit a handshake signal (REQHANDSHAKE) to the terminal device G, the terminal device G may judge whether to share information of the terminal device of the group (the group #1 and/or the group #3) with the terminal device A after receiving the handshake signal. Exemplarily but unlimitedly, the terminal device G may make such a judgment based on information, which is set by the user or a manager, indicating whether to allow another group to share the information of the terminal devices.

If the terminal device G determines that the information of the member terminal devices of the group is not allowed to be shared with the terminal device A, the terminal device G may transmit a NACK signal (NACKHANDSHAKE) to the terminal device A, so that the terminal device A may determine that the information of the member terminal devices of the group (the group #1 and/or the group #3) is not allowed to be transmitted with the terminal device G according to the NACK signal.

If the terminal device G determines that the information of the member terminal devices of the group is allowed to be shared with the terminal device A, the terminal device G may transmit an ACK signal (ACKHANDSHAKE) to the terminal device A, so that the terminal device A may determine that the information of the member terminal devices of the group (the group #1 and/or the group #3) is allowed to be transmitted with the terminal device G according to the ACK signal.

For example, the terminal device A may transmit indication information about the intra-group ID of each terminal device (including the member terminal device and the central terminal device) of the group #1 to the terminal device G.

For another example, the terminal device G may transmit indication information about intra-group IDs of the terminal devices (including the member terminal devices and the central terminal device) included in the group #3 to the terminal device A.

Alternatively, if the terminal device G determines that the information of the member terminal devices of the group is allowed to be shared with the terminal device A, the terminal device A may determine the terminal device G to be a member terminal device of the group #1. Moreover, the terminal device G may determine the terminal device A to be a member terminal device of the group #3.

Therefore, in the embodiment of the disclosure, the terminal device B may transmit data to the terminal device (recorded hereinafter as terminal device H for convenience of understanding and distinction) in the group #3.

Namely, the method alternatively further includes the following operations.

The first terminal device receives second data from the second terminal device with the first radio resource. The second data is to be transmitted to an eighth terminal device and the eighth terminal device belongs to a third group.

The first terminal device determines a third radio resource. The third radio resource is allocated to the first terminal device by a central terminal device of the third group.

The first terminal device transmits the second data to the central terminal device of the third group or the eighth terminal device with the third radio resource.

Specifically, for example, when the terminal device B (i.e., an example of the second terminal device) in the group #1 needs to transmit data (recorded hereinafter as data 4 for convenience of understanding and description) to one or more member terminal devices (i.e., an example of the eighth terminal device, recorded hereinafter as a terminal device J for convenience of understanding and description) in the group #3, the terminal device B may transmit a resource scheduling request message (recorded hereinafter as a scheduling request message 4-1 for convenience of understanding and distinction) to the terminal device A.

Therefore, the terminal device A may determine a radio resource (for example, a time-frequency resource) (recorded hereinafter as a radio frequency 4-1 for convenience of understanding and description) for transmitting the data 4 in the resource pool determined above according to the scheduling request message 4-1.

Exemplarily but unlimitedly, for example, the size of the resource allocated by the terminal device A every time may be fixed, that is, a size of the radio resource 4-1 may be specified in advance by, for example, the communication protocol and the like.

Or, exemplarily but unlimitedly, the scheduling request message 4-1 may alternatively include indication information about a size of the data 4, so that the terminal device A may determine the radio resource 4-1 based on the size of the data 4.

Or, exemplarily but unlimitedly, the scheduling request message 4-1 may alternatively include indication information about a service type of a service to which the data 4 belongs, so that the terminal device A may determine the radio resource 4-1 based on the service type of the service to which the data 4 belongs. Exemplarily but unlimitedly, for example, if the service to which the data 4 belongs is a service to be continuously (for example, continuously in the time domain) transmitted such as a video service, the terminal device A may determine a continuous resource to be the radio resource 4-1.

After the radio resource 4-1 is determined, as described above, the terminal device A may transmit indication information about the radio resource 4-1 to the terminal device B, so that the terminal device B may transmit the data 4 to the terminal device A with the radio resource 4-1. Exemplarily but unlimitedly, the indication information about the radio resource 4-1 may be configured to indicate a position of the radio resource 4-1 in the time domain or the frequency domain.

In the embodiment of the disclosure, the scheduling request message 4-1 may further include indication information indicating that the data 4 is to be transmitted to the terminal device J. Exemplarily but unlimitedly, in the embodiment of the disclosure, an intra-group ID of the terminal device J may be contained in a destination address field of a data packet carrying the data 4, so that the terminal device A may determine that the terminal device (i.e., the terminal device J) to which the data 4 is to be transmitted belongs to the group #3, based on indication information, acquired from the terminal device H, about the terminal device included in the group #3.

Therefore, the terminal device A may transmit a resource scheduling request message (recorded hereinafter as a scheduling request message 4-2 for convenience of understanding and distinction) to the terminal device H.

Therefore, the terminal device H may determine a radio resource (for example, a time-frequency resource) (recorded hereinafter as a radio resource 4-2 for convenience of understanding and description) for transmitting the data 4 from a resource pool for the group #3 according to the scheduling request message 4-2. Here, a determination process for the resource pool for the group #3 is similar to a determination process for the resource pool for the group #1, and detailed descriptions thereof will be omitted herein to avoid elaborations.

Exemplarily but unlimitedly, for example, a size of a resource allocated by the terminal device H may be fixed, that is, a size of the radio resource 4-2 may be specified in advance by, for example, the communication protocol and the like.

Or, exemplarily but unlimitedly, the scheduling request message 4-2 may alternatively include the indication information about the size of the data 4, so that the terminal device H may determine the radio resource 4-2 based on the size of the data 4.

Or, exemplarily but unlimitedly, the scheduling request message 4-2 may alternatively include the indication information about the service type of the service to which the data 4 belongs, so that the terminal device H may determine the radio resource 4-2 based on the service type of the service to which the data 4 belongs. Exemplarily but unlimitedly, for example, if the service to which the data 4 belongs is a service to be continuously (for example, continuously on the time domain) transmitted such as a video service, the terminal device H may determine a continuous resource to be the radio resource 4-2.

After the radio resource 4-2 is determined, as described above, the terminal device H may transmit indication information about the radio resource 4-2 to the terminal device A.

Therefore, for example, the terminal device A may transmit the data 4 to the terminal device H with the radio resource 4-2. Exemplarily but unlimitedly, the indication information about the radio resource 4-2 may be configured to indicate a position of the radio resource 4-2 in the time domain or the frequency domain. In the embodiment of the disclosure, the scheduling request message 4-2 may further include the indication information indicating that the data 4 is to be transmitted to the terminal device J. Exemplarily but unlimitedly, in the embodiment of the disclosure, the intra-group ID of the terminal device J may be contained in the destination address field of the data packet carrying the data 4, so that the terminal device H may transmit the data 4 to the terminal device J based on the intra-group ID contained in the destination address field of the data packet carrying the data 4. Here, a process that the terminal device H transmits the data to the terminal device J is similar to a process that the terminal device A transmits the data to the terminal device (for example, the terminal device B) in the group #1, and detailed descriptions thereof will be omitted herein to avoid elaborations.

Or, for example, the terminal device A may transmit the data 4 to the terminal device J with the radio resource 4-2. In this case, for example, the scheduling request message 4-2 may further include the indication information indicating that the data 4 is to be transmitted to the terminal device J, so that the terminal device H may determine that the data 4 is to be transmitted to the terminal device J and transmit the indication information about the radio resource 4-2 to the terminal device J, and then the terminal device J may perform detection on the radio resource 4-2 to receive the data 4 (or, a wireless signal carrying the data 4). Or, the terminal device J may further receive the data 4 in the blind detection manner. For example, the terminal device A may encapsulate device information of the terminal device J into the data packet carrying the data 4, so that the terminal device A, responsive to detection of the data packet carrying the device information of the terminal device J, may determine that the data packet carries the data (for example, the data 4) to be transmitted to the terminal device J and may further perform, for example, de-encapsulation processing on the data packet to further acquire the data 4.

In addition, in the embodiment of the disclosure, the terminal device in the group #3 may further transmit data to the terminal device B in the group #1. Moreover, this process is similar to a transmission process of the data 4, and detailed descriptions thereof will be omitted herein to avoid elaborations. Namely, the method further includes the following operations.

The first terminal device receives third data from the central terminal device of the third group with a fourth radio resource, the fourth radio resource being allocated by the central terminal device of the third group and the third data is to be transmitted to the second terminal device.

The first terminal device transmits the third data to the second terminal device with the first radio resource.

7: a new central node of the group is generated.

Alternatively, the method further includes the following operations.

The first terminal device transmits a third request message. The third request message indicates that the first terminal device requests to change the central terminal device of the first group.

The first terminal device receives a fourth request message from a ninth terminal device, which is a member terminal device of the first group. The fourth request message indicates that the ninth terminal device requests to be the central terminal device of the first group and the fourth request message is transmitted by the ninth terminal device according to the third request message.

The first terminal device determines the ninth terminal device to be the central terminal device of the first group according to the fourth request message.

Specifically, in the embodiment of the disclosure, the terminal device A may monitor its own communication condition and determine whether it can continue serving as the central terminal device of the group #1 according to its own communication condition.

Before the operation that the first terminal device transmits the third request message, the method further includes one of the following actions.

The first terminal device determines that a current state of charge is lower than or equal to a preset threshold value.

The first terminal device determines that a distance between the member terminal devices in the first group meets a preset condition.

Or, communication connection between the first terminal device and the network device is interrupted.

Specifically, exemplarily but unlimitedly, the terminal device A may determine that it cannot continue serving as the central terminal device of the group #1 when its own communication condition meets the following conditions.

A first condition: when the terminal device A is battery-powered terminal device, the terminal device A may detect its own state of charge. Moreover, when the state of charge is lower than or equal to the preset threshold value (preset power value), the terminal device A may determine that it cannot continue serving as the central terminal device of the group #1 and may initiate a subsequent process of changing the central terminal device.

A second condition: the terminal device A may detect a distance between the terminal devices of the group #1. Moreover, for example, when the distances between the terminal device A and a specified number (for example, a half of the number of the member terminal device of the group #1) of terminal devices of the group #1 are larger than a preset threshold value (preset distance value), the terminal device A may determine that it cannot continue serving as the central terminal device of the group #1 and may initiate the subsequent process of changing the central terminal device.

A third condition: when the terminal device A is a terminal device with a network connection, the terminal device A may detect its own network connection condition. Moreover, when the terminal device A loses the network connection (i.e., communication with the network device is interrupted) or the network connection is relatively poor (for example, a signal to interference and noise ratio is higher than a preset noise threshold value), the terminal device A may determine that it cannot continue serving as the central terminal device of the group #1 and may initiate the subsequent process of changing the central terminal device.

It should be understood that the conditions, listed above, for determining to initiate the process of changing the central terminal device are only exemplarily described and not intended to limit the disclosure, and the conditions may be freely set according to a specific usage condition.

The process of changing the central terminal device will be exemplarily described below.

For example, exemplarily but unlimitedly, the terminal device A may broadcast a step down application message to all the member terminal devices in the group #1. After receiving the step down application message, the member terminal device in the group #1 may judge whether it can serve as the central terminal device of the group #1. Exemplarily but unlimitedly, in the embodiment of the disclosure, a condition similar to the conditions 1~3 may be used for the judgment process. Or, the judgment process may be executed based on the sequences generated by the member terminal device and described in the process for establishing a group. For example, it may be judged that the terminal device generating the largest or smallest sequence among the terminal devices except the terminal device A can serve as the central terminal device of the group #1. Moreover, the member terminal device (recorded hereinafter as terminal device P for convenience of understanding and distinction) determined to be able to serve as the central terminal device of the group #1 may feedback ACK information ACKstepdown, so that the terminal device A may determine the terminal device transmitting the ACK information to be a new central terminal device of the group #1. It is important to note that, when multiple terminal devices transmit ACK information, the terminal device A may select one terminal device based on a preset rule (for example, a rule specified by the communication protocol or set by the manager) as the new central terminal device of the group #1.

Or, exemplarily but unlimitedly, the terminal device A may select one or more member terminal devices from the member terminal devices of the group #1 as a candidate terminal device and transmit a switching request message to the candidate terminal device, and each candidate terminal device may judge whether it can serve as the central terminal device of the group #1, and when determining that it can serve as the central terminal device of the group #1, feedback an ACK message to the terminal device A. Therefore, the terminal device A may determine the terminal device transmitting the ACK message as the new central terminal device of the group #1. It is important to note that, when multiple terminal devices transmit ACK messages, the terminal device A may select one terminal device based on a preset rule (for example, a rule specified by the communication protocol or set by the manager) as the new central terminal device of the group #1.

Then, the terminal device A may transmit contexts of the terminal devices of the group #1 to the new central terminal device of the group #1.

The new central terminal device of the group #1 may start broadcasting a group broadcast signal in a next broadcast period.

The terminal device A may serve as a member terminal device of the group #1, and stops broadcasting a group broadcast signal before the next broadcast period is started.

According to the method for D2D communication of the embodiment of the disclosure, at least two terminal devices negotiate to determine a central terminal device and member terminal device(s) in a group, and then the central terminal device in the group may allocate a radio resource for D2D communication to the member terminal device(s) in the group, so that resource scheduling may be implemented even without coordination of a cellular network (for example, an existing V2V communication technology, or, a network device coverage-free D2D communication technology). Therefore, the problem of collision caused by resource sharing may effectively be solved, a D2D communication success rate may be increased, a communication time delay may be reduced, a D2D communication capacity may be expanded, and efficiency and reliability of the D2D communication may be improved.

FIG. 4 illustrates a schematic flowchart of a method for D2D communication 300 described in the view angle of a member terminal device according to an embodiment of the disclosure.

As illustrated in FIG. 4, the method 300 includes the following operations.

In S310, second terminal device is determined to be a member terminal device of a first group. The first group includes a central terminal device and at least one member terminal device.

In S320, the second terminal device performs D2D communication with a first radio resource allocated by the central terminal device of the first group.

Alternatively, the operation that the second terminal device is determined to be the member terminal device of the first group includes the following actions.

The second terminal device generates a second sequence.

The second terminal device transmits second indication information indicating the second sequence and device information of the second terminal device. One device information is uniquely indicative of one terminal device.

The second terminal device receives first indication information indicative of a first sequence generated by first terminal device and device information of the first terminal device.

When a relationship between the first sequence and the second sequence meets a preset condition, the second terminal device determines the second terminal device to be the member terminal device of the first group.

Alternatively, the method further includes that, when the relationship between the first sequence and the second sequence meets the preset condition, the second terminal device determines the first terminal device to be the central terminal device of the first group.

Alternatively, the method further includes that, the second terminal device transmits a second sounding signal to enable the first terminal device, after determining that signal strength of the received second sounding signal is higher than or equal to first preset strength, to transmit the first indication information, or enable the first terminal device after determining that a distance between the first terminal device and the second terminal device determined based on the received second sounding signal is smaller than or equal to a first preset distance, to transmit the first indication information.

Alternatively, the operation that the second terminal device transmits the second indication information includes that, the second terminal device receives a first sounding signal from the first terminal device.

The operation that the second terminal device transmits the second indication information further includes that, after determining that a signal strength of the received first sounding signal is higher than or equal to a first preset strength, the second terminal device transmits the second indication information.

Or, the operation that the second terminal device transmits the second indication information further includes that, the second terminal device determines the distance between the first terminal device and the second terminal device based on the received first sounding signal and, after determining that the distance between the first terminal device and the second terminal device is smaller than or equal to the first preset distance, transmits the second indication information.

Alternatively, the first sequence is determined by the first terminal device according to the device information of the first terminal device.

The operation that the second terminal device generates the second sequence includes that, the second terminal device generates the second sequence according to the device information of the second terminal device.

Alternatively, before the operation that the second terminal device determines the second terminal device to be the member terminal device of the first group, the method further includes that, the second terminal device receives third indication information from the first terminal device, the third indication information indicating that the first terminal device requests to be the central terminal device.

Alternatively, the method further includes that, responsive to determination of the relationship between the first sequence and the second sequence meeting the preset condition, the second terminal device transmits fourth indication information indicating that the second terminal device allows the first terminal device to be the central terminal device of the first group.

Alternatively, the method further includes that, the second terminal device receives sixth indication information from the first terminal device, the sixth indication information being indicative of an intra-group ID allocated to the second terminal device by the first terminal device.

The operation that the second terminal device performs D2D communication with the first radio resource allocated by the central terminal device of the first group includes that, the second terminal device performs D2D communication based on the intra-group ID with the first radio resource allocated by the central terminal device of the first group.

Alternatively, the method further includes that, the second terminal device receives a first group broadcast signal periodically transmitted by the first terminal device. The first group broadcast signal carries a group ID of the first group and the device information of the first terminal device. The group ID of the first group is determined by the first terminal device, and a group ID is uniquely indicative of a device group.

Alternatively, before the operation that the second terminal device is determined to be the member terminal device of the first group, the method further includes one of the following operations.

After determining that signal strength of the received first group broadcast signal is higher than or equal to second preset strength, the second terminal device transmits a first request message to the first terminal device.

Or, after determining that the distance between the first terminal device and the second terminal device determined based on the received first group broadcast signal is smaller than or equal to a second preset distance, the second terminal device transmits the first request message to the first terminal device.

The first request message carries the device information of the second terminal device, and the first request message indicates that the second terminal device requests to join the first group.

Alternatively, the method further includes that, after determining that the signal strength of the received first group broadcast signal is lower than the second preset strength, or, after determining that the distance between the first terminal device and the second terminal device determined based on the received first group broadcast signal is larger than the second preset distance, the second terminal device transmits a second request message to the first terminal device. The second request message indicates that the second member terminal device requests to exit from the first group.

Alternatively, the method further includes one of the following operations.

The second terminal device determined to be the member terminal device of the first group transmits a heartbeat signal to the first terminal device at a preset interval.

Or, after determining that the signal strength of the received first group broadcast signal is lower than the second preset strength, the second terminal device stops transmitting the heartbeat signal.

Or, after determining that the distance between the first terminal device and the second terminal device determined based on the received first group broadcast signal is larger than the second preset distance, the second terminal device stops transmitting the heartbeat signal.

Alternatively, the operation that the second terminal device performs D2D communication with the first radio resource allocated by the central terminal device of the first group includes that, the second terminal device transmits first data to a seventh terminal device in the first group with the first radio resource.

Alternatively, the operation that the second terminal device performs D2D communication with the first radio resource allocated by the central terminal device of the first group includes that, the second terminal device transmits second data to the first terminal device with the first radio resource. The second data is to be transmitted to an eighth terminal device, and the eighth terminal device belongs to a third group.

Alternatively, the operation that the second terminal device performs D2D communication with the first radio resource allocated by the central terminal device of the first group includes that, the second terminal device receives third data from the first terminal device with the first radio resource. The third data has been transmitted to the first terminal device by a central terminal device of the third group with a fourth radio resource, and the fourth radio resource is allocated by the central terminal device of the third group.

Alternatively, the method further includes that, the second terminal device receives the third data from the central terminal device of the third group with the fourth radio resource, the fourth radio resource being allocated by the central terminal device of the third group.

Alternatively, the operation that the second terminal device performs D2D communication with the first radio resource allocated by the central terminal device of the first group includes that, the second terminal device transmits fourth data to the first terminal device with the first radio resource. The fourth data is to be transmitted to a network device.

Alternatively, the operation that the second terminal device performs D2D communication with the first radio resource allocated by the central terminal device of the first group includes that, the second terminal device receives fifth data transmitted by the first terminal device with the first radio resource. The fifth data has been transmitted to the first terminal device by a network device.

Alternatively, the method further includes the following operations.

The second terminal device receives a third request message from the first terminal device. The third request message indicates that the first terminal device requests to change the central terminal device of the first group.

The second terminal device transmits a fourth request message to the first terminal device according to the third request message. The fourth request message indicates that the second terminal device requests to be the central terminal device of the first group.

In the embodiment of the disclosure, each action and processing process executed by the second terminal device in the method 300 is similar to each action and processing process executed by the terminal device B in the method 200, each action and processing process executed by the first terminal device in the method 300 is similar to each action and processing process executed by the terminal device A in the method 200, and detailed descriptions thereof will be omitted to avoid elaboration.

According to the method for D2D communication of the embodiment of the disclosure, at least two terminal devices negotiate to determine a central terminal device and member terminal device(s) in a group, and then the central terminal device in the group may allocate a radio resource for D2D communication to the member terminal device(s) in the group, so that resource scheduling may be implemented even without coordination of a cellular network (for example, an existing V2V communication technology, or, a network device coverage-free D2D communication technology). Therefore, the problem of collision caused by resource sharing may effectively be solved, a D2D communication success rate may be increased, a communication time delay rimy be reduced, a D2D communication capacity may be expanded, and efficiency and reliability of the D2D communication may be improved.

The method for D2D communication according to the embodiments of the disclosure is described above in combination with FIG. 1 to FIG. 4 in detail, and a device for D2D communication according to the embodiments of the disclosure will be described below in combination with FIG. 5 and FIG. 6 in detail.

FIG. 5 illustrates a schematic block diagram of a device for D2D communication 400 according to an embodiment of the disclosure. As illustrated in FIG. 5, the device 400 includes a determination unit 410 and a processing unit 420.

The determination unit 410 is configured to determine the device to be a central terminal device of a first group. The first group includes the central terminal device and at least one member terminal device.

The processing unit 420 is configured to allocate a first radio resource to a second terminal device to enable the second terminal device to perform D2D communication with the first radio resource. The second terminal device is a member terminal device of the first group.

Alternatively, the determination unit 410 is configured to generate a first sequence.

The device 400 further includes a transmitting unit 430 and a receiving unit 440. The transmitting unit 430 is configured to transmit first indication information indicative of the first sequence and device information of the device 400. One piece of device information is uniquely indicative of one terminal device.

The receiving unit 440 is configured to receive at least one piece of second indication information. The at least one piece of second indication information corresponds to at least one third terminal device one to one and each piece of second indication information is indicative of a second sequence generated by a corresponding third terminal device and device information of the corresponding third terminal device.

The determination unit 410 is configured to, when a relationship between the first sequence and the second sequence meets a preset condition, determine the device to be the central terminal device of the first group.

Alternatively, the determination unit 410 is configured to, when the relationship between the first sequence and the second sequence meets the preset condition, determine that the third terminal device is a member terminal device of the first group.

Alternatively, the transmitting unit 430 is further configured to transmit a first sounding signal to enable the third terminal device, after determining that a signal strength of the received first sounding signal is higher than or equal to a first preset strength, to transmit the second indication information or enable the third terminal device, after determining that a distance between the device 400 and the second terminal device determined based on the received first sounding signal is smaller than or equal to a first preset distance, to transmit the second indication information.

Alternatively, the receiving unit 440 is further configured to receive a second sounding signal. The second sounding signal is transmitted by the third terminal device.

The determination unit 410 is further configured to, after determining that a signal strength of the received second sounding signal is higher than or equal to the first preset strength, control the transmitting unit 430 to transmit the first indication information.

Or, the determination unit 410 is further configured to determine a distance between the device 400 and the third terminal device based on the received second sounding signal and, after determining that the distance between the device 400 and the third terminal device is smaller than or equal to the first preset distance, control the transmitting unit 430 to transmit the first indication information.

Alternatively, the second sequence is determined by the third terminal device according to the device information of the third terminal device.

The determination unit 410 is specifically configured to generate the first sequence according to device information of the device 400.

Alternatively, the determination unit 410 is further configured to, when the relationship between the first sequence and the second sequence meets the preset condition, control the transmitting unit 430 to transmit third indication information indicating that the device 400 requests to be the central terminal device.

Alternatively, the receiving unit 440 is further configured to receive fourth indication information indicating that the third terminal device allows the device 400 to be the central terminal device of the first group. The fourth indication information is transmitted by the third terminal device responsive to determination of the relationship between the first sequence and the second sequence meeting the preset condition.

The determination unit 410 is specifically configured to determine the device to be the central terminal device of the first group according to the fourth indication information and determine that the third terminal device is the member terminal device.

Alternatively, the fourth indication information is further configured to indicate the first sequence.

Alternatively, the determination unit 410 is specifically configured to, responsive to determination of the fifth indication information not being received by the receiving unit 430 within a preset time period T after the transmitting unit 430 transmits the third indication information, determine the device to be the central terminal device of the first group and determine that the third terminal device is the member terminal device. The fifth indication information indicates that the third terminal device does not allow the device 400 to be the central terminal device of the first group.

Alternatively, the determination unit 410 is further configured to, when the receiving unit 440 receives the fifth indication information after the preset time period T, determine that the third terminal device does not belong to the first group.

Alternatively, the determination unit 410 is further configured to, responsive to determination of the receiving unit 440 receiving the fifth indication information within the preset time period T after the transmitting unit 430 transmits the third indication information, control the transmitting unit 430 to retransmit the first indication information. The fifth indication information indicates that the third terminal device does not allow the device 400 to be the central terminal device of the first group.

Alternatively, the fifth indication information is transmitted by the third terminal device after determining that the first indication information is received in error.

The fifth indication information further indicates a part, received in error, of the first indication information.

Alternatively, the processing unit 420 is further configured to allocate an intra-group ID to each terminal device in the first group. An intra-group ID is uniquely indicative of one terminal device in the first group.

The device 400 further includes a transmitting unit 430, configured to transmit sixth indication information indicative of the intra-group IDs of the terminal devices in the first group, to enable the terminal devices in the first group to perform D2D communication based on the intra-group IDs.

Alternatively, the determination unit 410 is further configured to determine a group ID of the first group. A group ID is uniquely indicative of an device group.

The device 400 further includes a transmitting unit 430, configured to periodically transmit a first group broadcast signal, the first group broadcast signal carrying the group ID of the first group and the device information of the device 400.

Alternatively, the device 400 further includes a receiving unit 440, configured to receive at least one second group broadcast signal. The at least one second group broadcast signal corresponds to at least one second group one to one, each second group broadcast signal is periodically transmitted by a central terminal device of the corresponding second group and each second group broadcast signal carries a group ID of the corresponding second group and device information of the central terminal device of the corresponding second group.

The determination unit 410 is further configured to, responsive to determination of the group ID of the second group being the same as the group ID of the first group, change the group ID of the first group.

The determination unit 410 is further configured to, responsive to determination of the group ID of the second group being the same as the group ID of the first group, control the transmitting unit 430 to transmit ninth indication information indicating, to the central terminal device of the second group, changing the group ID of the second group.

Alternatively, the device 400 further includes a receiving unit 440, configured to receive a first request message from a fourth terminal device. The first request message carries device information of the fourth terminal device. The first request message indicates that the fourth terminal device requests to join the first group. The first request message is transmitted by the second terminal device after determining that a signal strength of the received first group broadcast signal is higher than or equal to a second preset strength, or, the first request message is transmitted by the second terminal device after determining that a distance between the device 400 and the fourth terminal device determined based on the received first group broadcast signal is smaller than or equal to a second preset distance.

The determination unit 410 is further configured to determine that the fourth terminal device is a member terminal device of the first group according to the first request message.

Alternatively, the device 400 further includes a receiving unit 440, configured to receive a second request message from a fifth terminal device in the first group. The fifth terminal device is a member terminal device of the first group. The second request message indicates that the fifth terminal device requests to exit from the first group. The second request message is transmitted by the fifth terminal device after determining that the signal strength of the received first group broadcast signal is lower than the second preset strength. Or, the second request message is transmitted by the fifth terminal device after determining that a distance between the device 400 and the fifth terminal device determined based on the received first group broadcast signal is larger than the second preset distance.

The determination unit 410 is further configured to determine that the fifth terminal device is not a member terminal device of the first group according to the second request message.

Alternatively, the device 400 further includes a receiving unit 440, configured to receive a heartbeat signal from a sixth terminal device, which is a member terminal device of the first group. The heartbeat signal carries device information of the sixth terminal device and is transmitted by the sixth terminal device according to a period which is preset or configured by the first terminal device after determining to be a member terminal device of the first group.

The determination unit 410 is further configured to, responsive to determination of the receiving unit 440 not receiving the heartbeat signal within a preset duration, determine that the sixth terminal device is not a member terminal device of the first group. The preset duration is larger than or equal to a duration of the preset period. The sixth terminal device stops transmitting the heartbeat signal after determining that the signal strength of the received first group broadcast signal is lower than the second preset strength. Or, the sixth terminal device stops transmitting the heartbeat signal after determining that a distance between the device 400 and the sixth terminal device determined based on the received first group broadcast signal is larger than the second preset distance.

Alternatively, the first radio resource is used for the second terminal device to transmit first data to a seventh terminal device in the first group.

Alternatively, the device 400 further includes a transmitting unit 430, configured to transmit indication information about the first radio resource to the seventh terminal device.

Alternatively, the device 400 further includes a transmitting unit 430, configured to transmit tenth indication information to the seventh terminal device. The tenth indication information indicates, to the seventh terminal device, transmitting a sounding signal.

Alternatively, the processing unit 420 is further configured to allocate a second radio resource to the seventh terminal device to enable the seventh terminal device to transmit feedback information for the first data with the second radio resource.

Alternatively, the device 400 further includes a receiving unit 440, configured to receive a third group broadcast signal. The third group broadcast signal is periodically transmitted by a central terminal device of a third group. The third group broadcast signal carries a group ID of the third group and device information of the central terminal device of the third group.

The determination unit 410 is further configured to control the transmitting unit 430 and the receiving unit 440 to perform communication with the central terminal device of the third group according to the third group broadcast signal to determine terminal device included in the third group and enable the central terminal device of the third group to learn about the terminal device included in the first group.

Alternatively, the device 400 further includes a receiving unit 440, configured to receive second data from the second terminal device with the first radio resource. The second data is to be transmitted to an eighth terminal device, and the eighth terminal device belongs to the third group.

The determination unit 410 is further configured to determine a third radio resource. The third radio resource is allocated to the device 400 by the central terminal device of the third group.

The transmitting unit 430 is configured to transmit the second data to the central terminal device of the third group or the eighth terminal device with the third radio resource.

Alternatively, the device 400 further includes a receiving unit 440, configured to receive third data from the central terminal device of the third group with a fourth radio resource. The fourth radio resource is allocated by the central terminal device of the third group and the third data is to be transmitted to the second terminal device.

The device 400 further includes a transmitting unit 430, configured to transmit the third data to the second terminal device with the first radio resource.

Alternatively, the device 400 further includes a receiving unit 440, configured to receive fourth data from the second terminal device with the first radio resource. The fourth data is to be transmitted to a network device.

The device 400 further includes a transmitting unit 430, configured to transmit the fourth data to the network device.

Alternatively, the device 400 further includes a receiving unit 440, configured to receive fifth data transmitted by the network device. The fifth data is to be transmitted to the second terminal device.

The transmitting unit 430 is configured to transmit the fifth data to the second terminal device with the first radio resource.

Alternatively, the device 400 further includes a transmitting unit 430, configured to transmit a third request message. The third request message indicates that the device 400 requests to change the central terminal device of the first group.

The receiving unit 440 is configured to receive a fourth request message from a ninth terminal device, which is a member terminal device of the first group. The fourth request message indicates that the ninth terminal device requests to be the central terminal device of the first group and is transmitted by the ninth terminal device according to the third request message.

The device 400 determines the ninth terminal device to be the central terminal device of the first group according to the fourth request message.

Alternatively, the determination unit 410 is further configured to determine that a current state of charge is lower than or equal to a preset threshold value.

Or, the determination unit 410 is further configured to determine that a distance to each member terminal device in the first group meets a preset condition.

Or, the determination unit 410 is further configured to interrupt a communication connection with the network device.

The device for D2D communication 400 according to the embodiment of the disclosure may correspond to a first terminal device (for example, terminal device A) in the method of the embodiment of the disclosure. Moreover, each unit, module, in the device for D2D communication 400 and the other abovementioned operations and/or functions are intended to implement the corresponding flows in the method 200 in FIG. 2 and will not be elaborated herein for simplicity.

According to the device for D2D communication of the embodiment of the disclosure, at least two terminal devices negotiate to determine a central terminal device and member terminal device(s) in a group, and then the central terminal device in the group may allocate a radio resource for D2D communication to the member terminal device(s) in the group, so that resource scheduling may be implemented even without coordination of a cellular network (for example, an existing V2V communication technology, or, a network device coverage-free D2D communication technology). Therefore, the problem of collision caused by resource sharing may effectively be solved, a D2D communication success rate may be increased, a communication time delay may be reduced, a D2D communication capacity may be expanded, and efficiency and reliability of the D2D communication may be improved.

FIG. 6 illustrates a schematic block diagram of a device for D2D communication 500 according to an embodiment of the disclosure. As illustrated in FIG. 6, the device 500 includes a determination unit 510 and a communication unit 520.

The determination unit 510 is configured to determine the device to be a member terminal device of a first group. The first group includes a central terminal device and at least one member terminal device.

The communication unit 520 is configured to perform D2D communication with a first radio resource allocated by the central terminal device of the first group.

Alternatively, the determination unit 510 is configured to generate a second sequence.

The communication unit 520 is configured to transmit second indication information indicative of the second sequence and device information of the device 500. One piece of device information is uniquely indicative of one terminal device.

The communication unit 520 is configured to receive first indication information indicative of a first sequence generated by first terminal device and device information of the first terminal device.

The determination unit 510 is configured to, when a relationship between the first sequence and the second sequence meets a preset condition, determine the device to be the member terminal device of the first group.

Alternatively, the determination unit 510 is configured to, when the relationship between the first sequence and the second sequence meets the preset condition, determine the first terminal device to be the central terminal device of the first group.

Alternatively, the communication unit 520 is configured to transmit a second sounding signal to enable the first terminal device, after determining that signal strength of the received second sounding signal is higher than or equal to first preset strength, to transmit the first indication information or enable the first terminal device, after determining that a distance between the first terminal device and the device 500 determined based on the received second sounding signal is smaller than or equal to a first preset distance, to transmit the first indication information.

Alternatively, the communication unit 520 is configured to receive a first sounding signal. The first sounding signal is transmitted by the first terminal device.

The determination unit 510 is configured to, after determining that a signal strength of the first sounding signal received by the communication unit 520 is higher than or equal to the first preset strength, control the communication unit 520 to transmit the second indication information.

Or, the determination unit 510 is configured to determine the distance between the first terminal device and the device 500 based on the first sounding signal received by thee communication unit 520 and, after determining that the distance between the first terminal device and the device 500 is smaller than or equal to the first preset distance, control the communication unit 520 to transmit the second indication information.

Alternatively, the first sequence is determined by the first terminal device according to the device information of the first terminal device.

The determination unit 510 is configured to generate the second sequence according to the device information of the device 500.

Alternatively, the communication unit 520 is configured to receive third indication information from the first terminal device. The third indication information indicates that the first terminal device requests to be the central terminal device.

Alternatively, the determination unit 510 is configured to, responsive to determination of the relationship between the first sequence and the second sequence meeting the preset condition, control the communication unit 520 to transmit fourth indication information indicating that the device 500 allows the first terminal device to be the central terminal device of the first group.

Alternatively, the communication unit 520 is configured to receive sixth indication information from the first terminal device. The sixth indication information indicates an intra-group ID allocated to the device 500 by the first terminal device.

The communication unit 520 is configured to perform D2D communication based on the intra-group ID with the first radio resource allocated by the central terminal device of the first group.

Alternatively, the communication unit 520 is configured to receive a first group broadcast signal periodically transmitted by the first terminal device. The first group broadcast signal carries a group ID of the first group and the device information of the first terminal device. The group ID of the first group is determined by the first terminal device, and a group ID is uniquely indicative of an device group.

Alternatively, the determination unit 510 is configured to, after determining that a signal strength of the first group broadcast signal received by the communication unit 520 is higher than or equal to a second preset strength, control the communication unit 520 to transmit a first request message to the first terminal device.

Or, the determination unit 510 is configured to, after determining that the distance between the first terminal device and the device 500 determined based on the first group broadcast signal received by the communication unit 520 is smaller than or equal to a second preset distance, control the communication unit 520 to transmit the first request message to the first terminal device.

The first request message carries the device information of the device 500, and the first request message indicates that the device 500 requests to join the first group.

Alternatively, the determination unit 510 is configured to, after determining that the signal strength of the first group broadcast signal received by the communication unit 520 is lower than the second preset strength, control the communication unit 520 to transmit the second request message to the first terminal device.

Or, the determination unit 510 is configured to, after determining that the distance between the first terminal device and the device 500 determined based on the first group broadcast signal received by the communication unit 520 is larger than the second preset distance, control the communication unit 520 to transmit the second request message to the first terminal device.

The second request message indicates that second member terminal device requests to exit from the first group.

Alternatively, the determination unit 510 is configured to, after determining the device to be the member terminal device of the first group, control the communication unit 520 to transmit a heartbeat signal to the first terminal device at a preset interval.

The determination unit 510 is configured to, after determining that the signal strength of the first group broadcast signal received by the communication unit 520 is lower than the second preset strength, control the communication unit 520 to stop transmitting the heartbeat signal.

Or, the determination unit 510 is configured to, after determining that the distance between the first terminal device and the device 500 determined based on the first group broadcast signal received by the communication unit 520 is larger than the second preset distance, control the communication unit 520 to stop transmitting the heartbeat signal.

Alternatively, the communication unit 520 is configured to transmit first data to a seventh terminal device in the first group with the first radio resource.

Alternatively, the communication unit 520 is configured to transmit second data to the first terminal device with the first radio resource. The second data is to be transmitted to an eighth terminal device, and the eighth terminal device belongs to a third group.

Alternatively, the communication unit 520 is configured to receive third data from the first terminal device with the first radio resource. The third data has been transmitted to the first terminal device by a central terminal device of the third group with a fourth radio resource, and the fourth radio resource is allocated by the central terminal device of the third group.

Alternatively, the communication unit 520 is configured to receive the third data from the central terminal device of the third group with the fourth radio resource. The fourth radio resource is allocated by the central terminal device of the third group.

Alternatively, the communication unit 520 is configured to transmit fourth data to the first terminal device with the first radio resource. The fourth data is to be transmitted to a network device.

Alternatively, the communication unit 520 is configured to receive fifth data from the first terminal device with the first radio resource. The fifth data has been transmitted to the first terminal device by a network device.

Alternatively, the communication unit 520 is configured to receive a third request message from the first terminal device. The third request message indicates that the first terminal device requests to change the central terminal device of the first group.

The communication unit 520 is configured to transmit a fourth request message to the first terminal device according to the third request message. The fourth request message indicates that the device 500 requests to be the central terminal device of the first group.

The device for D2D communication 500 according to the embodiment of the disclosure may correspond to a second terminal device (for example, terminal device B) in the method of the embodiment of the disclosure. Moreover, each unit, i.e., module, in the device for D2D communication 500 and the other abovementioned operations and/or functions are intended to implement the corresponding flows in the method 300 in FIG. 4 and will not be elaborated herein for simplicity.

According to the device for D2D communication of the embodiment of the disclosure, at least two terminal devices negotiate to determine a central terminal device and member terminal device(s) in a group, and then the central terminal device in the group may allocate a radio resource for D2D communication to the member terminal device(s) in the group, so that resource scheduling may be implemented even without coordination of a cellular network (for example, an existing V2V communication technology, or, a network device coverage-free D2D communication technology). Therefore, the problem of collision caused by resource sharing may effectively be solved, a D2D communication success rate may be increased, a communication time delay may be reduced, a D2D communication capacity may be expanded, and efficiency and reliability of the D2D communication may be improved.

The method for D2D communication according to the embodiments of the disclosure is described in combination with FIG. 1 to FIG. 4 in detail, and device for D2D communication according to the embodiments of the disclosure will be described below in combination with FIG. 7 and FIG. 8 in detail.

Figure 7:
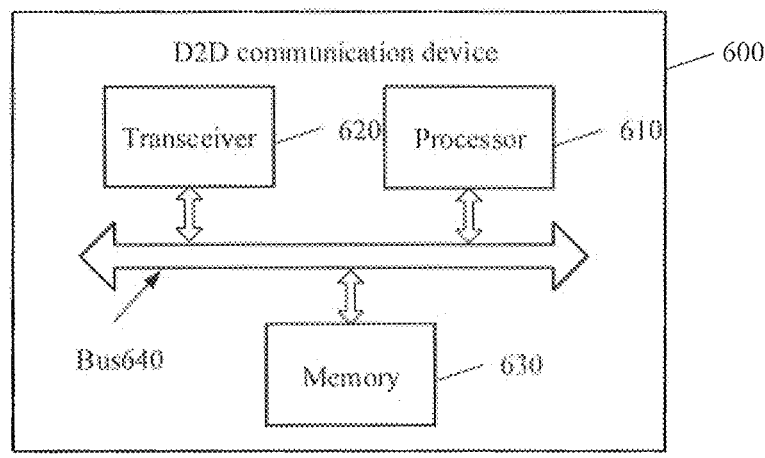
FIG. 7 illustrates a schematic structure diagram of device for D2D communication according to an embodiment of the disclosure.

FIG. 7 illustrates a schematic block diagram of device for D2D communication 600 according to an embodiment of the disclosure. As illustrated in FIG. 7, the device 600 includes a processor 610 and a transceiver 620, and the processor 610 is connected with the transceiver 620. Alternatively, the device 600 further includes a memory 630, and the memory 630 is connected with the processor 610. Furthermore, the device 600 may include a bus system 640. The processor 610, the memory 630 and the transceiver 620 may be connected through the bus system 640. The memory 630 may be configured to store instructions, and the processor 610 is configured to execute the instructions stored in the memory 630 to control the transceiver 620 to transmit information or a signal.

The processor 610 is configured to determine the device 600 to be a central terminal device of a first group. The first group includes the central terminal device and at least one member terminal device.

The processor 610 is configured to allocate a first radio resource to a second terminal device to enable the second terminal device to perform D2D communication with the first radio resource. The second terminal device is a member terminal device of the first group.

Alternatively, the processor 610 is configured to generate a first sequence.

The processor 610 is configured to control the transceiver 620 to transmit first indication information indicative of the first sequence and device information of the device 600. One piece of device information is uniquely indicative of one terminal device.

The processor 610 is configured to control the transceiver 620 to receive at least one piece of second indication information. The at least one piece of second indication information corresponds to at least one third terminal device one to one. Each piece of second indication information is indicative of a second sequence generated by a corresponding third terminal device and device information of the corresponding third terminal device.

The processor 610 is configured to, when a relationship between the first sequence and the second sequence meets a preset condition, determine the device 600 to be the central terminal device of the first group.

Alternatively, the processor 610 is configured to, when the relationship between the first sequence and the second sequence meets the preset condition, determine that the third terminal device is a member terminal device of the first group.

Alternatively, the processor 610 is configured to control the transceiver 620 to transmit a first sounding signal to enable the third terminal device, after determining that a signal strength of the received first sounding signal is higher than or equal to a first preset strength, to transmit the second indication information or enable the third terminal device, after determining that a distance between the device 600 and the second terminal device determined based on the received first sounding signal is smaller than or equal to a first preset distance, to transmit the second indication information.

Alternatively, the processor 610 is configured to control the transceiver 620 to receive a second sounding signal. The second sounding signal is transmitted by the third terminal device.

The processor 610 is further configured to, after determining that signal strength of the received second sounding signal is higher than or equal to the first preset strength, transmit the first indication information.

Or, the processor 610 is further configured to determine a distance between the device 600 and the third terminal device based on the received second sounding signal and, after determining that the distance between the device 600 and the third terminal device is smaller than or equal to the first preset distance, transmit the first indication information.

Alternatively, the processor 610 is configured to generate the first sequence according to device information of the device 600.

Alternatively, the processor 610 is configured to, when the relationship between the first sequence and the second sequence meets the preset condition, send, by the device 600, third indication information indicating that the device 600 requests to be the central terminal device.

Alternatively, the processor 610 is configured to control the transceiver 620 to receive fourth indication information indicating that the third terminal device allows the device 600 to be the central terminal device of the first group. The fourth indication information is transmitted by the third terminal device responsive to determination of the relationship between the first sequence and the second sequence meeting the preset condition.

The processor 610 is configured to determine the device 600 to be the central terminal device of the first group according to the fourth indication information and determine that the third terminal device is the member terminal device.

Alternatively, the fourth indication information is further configured to indicate the first sequence.

Alternatively, the processor 610 is configured to, responsive to determination of fifth indication information not being received within a preset time period T after transmitting the third indication information, determine the device 600 to be the central terminal device of the first group and determine that the third terminal device is the member terminal device. The fifth indication information indicates that the third terminal device does not allow the device 600 to be the central terminal device of the first group.

Alternatively, the processor 610 is configured to, when controlling the transceiver 620 to receive the fifth indication information after the preset time period T, determine that the third terminal device does not belong to the first group.

Alternatively, the processor 610 is further configured to, responsive to determination of the fifth indication information being received within the preset time period T after transmitting the third indication information, retransmit the first indication information. The fifth indication information indicates that the third terminal device does not allow the device 600 to be the central terminal device of the first group.

Alternatively, the fifth indication information is transmitted by the third terminal device after determining that the first indication information is received in error.

The fifth indication information further indicates a part, received in error, of the first indication information.

Alternatively, the processor 610 is configured to allocate an intra-group ID to each terminal device in the first group. An intra-group ID is uniquely indicative of one terminal device in the first group.

The device 600 transmits sixth indication information indicative of the intra-group IDs of the terminal devices in the first group, to enable the terminal devices in the first group to perform D2D communication based on the intra-group IDs.

Alternatively, the processor 610 is configured to determine a group ID of the first group, wherein a group ID is uniquely indicative of a device group.

The processor 610 is configured to control the transceiver 620 to periodically transmit a first group broadcast signal, the first group broadcast signal carrying the group ID of the first group and the device information of the device 600.

Alternatively, the processor 610 is configured to control the transceiver 620 to detect at least one second group broadcast signal. The at least one second group broadcast signal corresponds to at least one second group one to one. Each second group broadcast signal is periodically transmitted by a central terminal device of the corresponding second group and each second group broadcast signal carries a group ID of the corresponding second group and device information of the central terminal device of the corresponding second group.

The processor 610 is configured to, responsive to determination of the group ID of the second group being the same as the group ID of the first group, change the group ID of the first group.

Or, the processor 610 is configured to, responsive to determination of the group ID of the second group being the same as the group ID of the first group, control the transceiver 620 to transmit ninth indication information indicating, to the central terminal device of the second group, changing the group ID of the second group.

Alternatively, the processor 610 is configured to control the transceiver 620 to receive a first request message from a fourth terminal device. The first request message carries device information of the fourth terminal device. The first request message indicates that the fourth terminal device requests to join the first group. The first request message is transmitted by the second terminal device after determining that signal strength of the received first group broadcast signal is higher than or equal to second preset strength, or, the first request message is transmitted by the second terminal device after determining that a distance between the device 600 and the fourth terminal device determined based on the received first group broadcast signal is smaller than or equal to a second preset distance.

The processor 610 is configured to determine that the fourth terminal device is a member terminal device of the first group according to the first request message.

Alternatively, the processor 610 is configured to control the transceiver 620 to receive a second request message from a fifth terminal device in the first group. The fifth terminal device is a member terminal device of the first group. The second request message indicates that the fifth terminal device requests to exit from the first group. The second request message is transmitted by the fifth terminal device after determining that the signal strength of the received first group broadcast signal is lower than the second preset strength, or, the second request message is transmitted by the fifth terminal device after determining that a distance between the device 600 and the fifth terminal device determined based on the received first group broadcast signal is larger than the second preset distance.

The processor 610 is configured to determine that the fifth terminal device is not a member terminal device of the first group according to the second request message.

Alternatively, the processor 610 is configured to control the transceiver 620 to detect a heartbeat signal from a sixth terminal device, which is a member terminal device of the first group. The heartbeat signal carries device information of the sixth terminal device and the heartbeat signal is transmitted by the sixth terminal device according to a period which is preset or configured by the sixth terminal device after determining to be a member terminal device of the first group.

The processor 610 is configured to, responsive to determination of the heartbeat signal not being received within a preset duration, determine that the sixth terminal device is not a member terminal device of the first group. The preset duration is larger than or equal to a duration of the preset period. The sixth terminal device stops transmitting the heartbeat signal after determining that the signal strength of the received first group broadcast signal is lower than the second preset strength. Or, the sixth terminal device stops transmitting the heartbeat signal after determining that a distance between the device 600 and the sixth terminal device determined based on the received first group broadcast signal is larger than the second preset distance.

Alternatively, the first radio resource is used for the second terminal device to transmit first data to a seventh terminal device in the first group.

Alternatively, the processor 610 is configured to control the transceiver 620 to transmit indication information about the first radio resource to the seventh terminal device.

Alternatively, the processor 610 is configured to control the transceiver 620 to transmit tenth indication information to the seventh terminal device, the tenth indication information indicates, to the seventh terminal device, transmitting a sounding signal.

Alternatively, the processor 610 is configured to allocate a second radio resource to the seventh terminal device to enable the seventh terminal device to transmit feedback information for the first data through the second radio resource.

Alternatively, the processor 610 is configured to control the transceiver 620 to receive a third group broadcast signal. The third group broadcast signal is periodically transmitted by a central terminal device of a third group. The third group broadcast signal carries a group ID of the third group and device information of the central terminal device of the third group.

The processor 610 is configured to perform communication with the central terminal device of the third group according to the third group broadcast signal to determine the terminal device(s) included in the third group and enable the central terminal device of the third group to learn about the terminal device(s) included in the first group.

Alternatively, the processor 610 is configured to control the transceiver 620 to receive second data from the second terminal device with the first radio resource. The second data is to be transmitted to an eighth terminal device and the eighth terminal device belongs to the third group.

The processor 610 is configured to determine a third radio resource. The third radio resource is allocated to the device 600 by the central terminal device of the third group.

Alternatively, the processor 610 is configured to control the transceiver 620 to transmit the second data to the central terminal device of the third group or the eighth terminal device with the third radio resource.

Alternatively, the processor 610 is configured to control the transceiver 620 to receive third data from the central terminal device of the third group with a fourth radio resource. The fourth radio resource is allocated by the central terminal device of the third group and the third data is to be transmitted to the second terminal device.

The processor 610 is configured to transmit the third data to the second terminal device with the first radio resource.

Alternatively, the processor 610 is configured to control the transceiver 620 to receive fourth data from the second terminal device with the first radio resource. The fourth data is to be transmitted to a network device.

The processor 610 is configured to control the transceiver 620 to transmit the fourth data to the network device.

Alternatively, the processor 610 is configured to control the transceiver 620 to receive fifth data from the network device. The fifth data is to be transmitted to the second terminal device.

The processor 610 is configured to control the transceiver 620 to transmit the fifth data to the second terminal device with the first radio resource.

Alternatively, the processor 610 is configured to control the transceiver 620 to transmit a third request message. The third request message indicates that the device 600 requests to change the central terminal device of the first group.

The processor 610 is configured to control the transceiver 620 to receive a fourth request message from a ninth terminal device, which is a member terminal device of the first group. The fourth request message indicates that the ninth terminal device requests to be the central terminal device of the first group. The fourth request message is transmitted by the ninth terminal device according to the third request message.

The processor 610 is configured to determine the ninth terminal device to be the central terminal device of the first group according to the fourth request message.

Alternatively, the processor 610 is configured to determine that a current state of charge is lower than or equal to a preset threshold value.

The processor 610 is configured to determine that distances between the member terminal devices in the first group meet a preset condition.

Or, the processor 610 is configured to interrupt a communication connection with the network device.

The device for D2D communication 600 according to the embodiment of the disclosure may correspond to the first terminal device (for example, terminal device A) in the method of the embodiment of the disclosure. Moreover, each unit, i.e., module, in the device for D2D communication 600 and the other abovementioned operations and/or functions are intended to implement the corresponding flows in the method 200 in FIG. 2 and will not be elaborated herein for simplicity.

According to the device for D2D communication of the embodiment of the disclosure, at least two terminal devices negotiate to determine a central terminal device and member terminal device(s) in a group, and then the central terminal device in the group may allocate a radio resource for D2D communication to the member terminal device(s) in the group, so that resource scheduling may be implemented even without coordination of a cellular network (for example, an existing V2V communication technology, or, a network device coverage-free D2D communication technology). Therefore, the problem of collision caused by resource sharing may effectively be solved, a D2D communication success rate may be increased, a communication time delay may be reduced, a D2D communication capacity may be expanded, and efficiency and reliability of the D2D communication may be improved.

Figure 8:
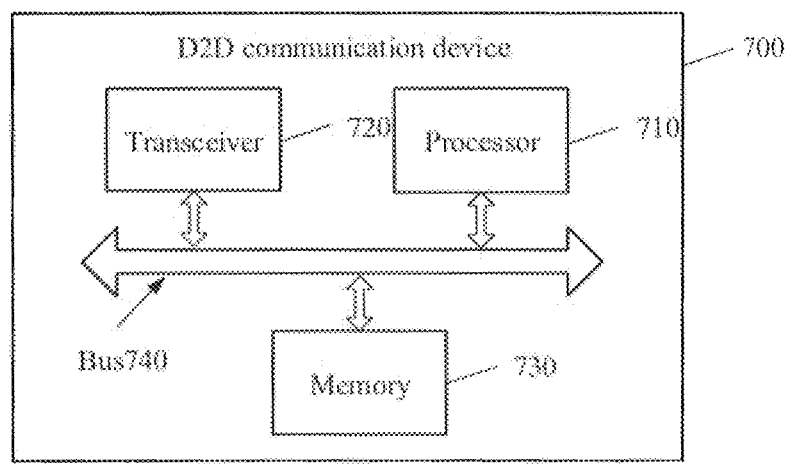
FIG. 8 illustrates a schematic structure diagram of device for D2D communication according to another embodiment of the disclosure.

FIG. 8 illustrates a schematic block diagram of device for D2D communication 700 according to an embodiment of the disclosure. As illustrated in FIG. 8, the device 700 includes: a processor 710 and a transceiver 720, and the processor 710 is connected with the transceiver 720. Alternatively, the device 700 further includes a memory 730, and the memory 730 is connected with the processor 710. Furthermore, the device 700 may include a bus system 740. The processor 710, the memory 730 and the transceiver 720 may be connected through the bus system 740. The memory 730 may be configured to store instructions, and the processor 710 is configured to execute the instructions stored in the memory 730 to control the transceiver 720 to transmit information or a signal.

The processor 710 is configured to determine the device 700 to be a member terminal device of a first group. The first group includes a central terminal device and at least one member terminal device, The processor 710 is configured to control the transceiver 720 to perform D2D communication with a first radio resource allocated by the central terminal device of the first group.

Alternatively, the processor 710 is configured to generate a second sequence.

The processor 710 is configured to control the transceiver 720 to transmit second indication information indicative of the second sequence and device information of the device 700. One piece of device information is uniquely indicative of one terminal device.

The processor 710 is configured to control the transceiver 720 to receive first indication information indicative of a first sequence generated by first terminal device and device information of the first terminal device.

The processor 710 is configured to, when a relationship between the first sequence and the second sequence meets a preset condition, determine the device 700 to be the member terminal device of the first group.

Alternatively, the processor 710 is configured to, when the relationship between the first sequence and the second sequence meets the preset condition, determine the first terminal device to be the central terminal device of the first group.

Alternatively, the processor 710 is configured to control the transceiver 720 to transmit a second sounding signal to enable the first terminal device, after determining that a signal strength of the received second sounding signal is higher than or equal to a first preset strength, to transmit the first indication information, or enable the first terminal device, after determining that a distance between the first terminal device and the device 700 determined based on the received second sounding signal is smaller than or equal to a first preset distance, to transmit the first indication information.

Alternatively, the processor 710 is configured to control the transceiver 720 to receive a first sounding signal from the first terminal device.

The processor 710 is configured to, after determining that a signal strength of the received first sounding signal is higher than or equal to a first preset strength, control the transceiver 720 to transmit the second indication information.

Or, the processor 710 is configured to determine the distance between the first terminal device and the device 700 based on the received first sounding signal and, after determining that the distance between the first terminal device and the device 700 is smaller than or equal to the first preset distance, control the transceiver 720 to transmit the second indication information.

Alternatively, the first sequence is determined by the first terminal device according to the device information of the first terminal device.

The processor 710 is configured to generate the second sequence according to the device information of the device 700.

Alternatively, the processor 710 is configured to control the transceiver 720 to receive third indication information from the first terminal device. The third indication information indicates that the first terminal device requests to be the central terminal device.

Alternatively, the processor 710 is configured to, responsive to determination of the relationship between the first sequence and the second sequence meeting the preset condition, control the transceiver 720 to transmit fourth indication information indicating that the device 700 allows the first terminal device to be the central terminal device of the first group.

Alternatively, the processor 710 is configured to control the transceiver 720 to receive sixth indication information from the first terminal device. The sixth indication information is indicative of an intra-group ID allocated to the device 700 by the first terminal device.

The processor 710 is configured to control the transceiver 720 to perform D2D communication based on the intra-group ID with the first radio resource allocated by the central terminal device of the first group.

Alternatively, the processor 710 is configured to control the transceiver 720 to receive a first group broadcast signal periodically transmitted by the first terminal device. The first group broadcast signal carries a group ID of the first group and the device information of the first terminal device. The group ID of the first group is determined by the first terminal device, and a group ID is uniquely indicative of an device group.

Alternatively, the processor 710 is configured to, after determining that signal strength of the received first group broadcast signal is higher than or equal to second preset strength, control the transceiver 720 to transmit a first request message to the first terminal device.

Or, the processor 710 is configured to, after determining that the distance between the first terminal device and the device 700 determined based on the received first group broadcast signal is smaller than or equal to a second preset distance, control the transceiver 720 to transmit the first request message to the first terminal device.

The first request message carries the device information of the device 700, and the first request message indicates that the device 700 requests to join the first group.

Alternatively, the processor 710 is configured to, after determining that the signal strength of the received first group broadcast signal is lower than the second preset strength, or, after determining that the distance, determined based on the received first group broadcast signal, between the first terminal device and the device 700 is larger than the second preset distance, control the transceiver 720 to transmit a second request message to the first terminal device. The second request message indicates that second member terminal device requests to exit from the first group.

Alternatively, the processor 710 is configured to, after determining the device to be the member terminal device of the first group, control the transceiver 720 to transmit a heartbeat signal to the first terminal device at a preset interval.

The processor 710 is configured to, after determining that the signal strength of the received first group broadcast signal is lower than the second preset strength, control the transceiver 720 to stop transmitting the heartbeat signal.

Or, the processor 710 is configured to, after determining that the distance between the first terminal device and the device 700 determined based on the received first group broadcast signal is larger than the second preset distance, control the transceiver 720 to stop transmitting the heartbeat signal.

Alternatively, the processor 710 is configured to control the transceiver 720 to transmit first data to a seventh terminal device in the first group with the first radio resource.

Alternatively, the processor 710 is configured to control the transceiver 720 to transmit second data to the first terminal device with the first radio resource. The second data is to be transmitted to an eighth terminal device, and the eighth terminal device belongs to a third group.

Alternatively, the processor 710 is configured to control the transceiver 720 to receive third data from the first terminal device with the first radio resource. The third data has been transmitted to the first terminal device by a central terminal device of the third group with a fourth radio resource, and the fourth radio resource is allocated by the central terminal device of the third group.

Alternatively, the processor 710 is configured to control the transceiver 720 to receive the third data from the central terminal device of the third group with the fourth radio resource. The fourth radio resource is allocated by the central terminal device of the third group.

Alternatively, the processor 710 is configured to control the transceiver 720 to transmit fourth data to the first terminal device with the first radio resource, the fourth data is to be transmitted to a network device.

Alternatively, the processor 710 is configured to control the transceiver 720 to receive fifth data from the first terminal device with the first radio resource. The fifth data has been transmitted to the first terminal device by a network device.

Alternatively, the processor 710 is configured to control the transceiver 720 to receive a third request message from the first terminal device. The third request message indicates that the first terminal device requests to change the central terminal device of the first group.

The processor 710 is configured to transmit a fourth request message to the first terminal device according to the third request message. The fourth request message indicates that the device 700 requests to be the central terminal device of the first group.

The device for D2D communication 700 according to the embodiment of the disclosure may correspond to the second terminal device (for example, terminal device B) in the method of the embodiment of the disclosure. Moreover, each unit, i.e., module, in the device for D2D communication 700 and the other abovementioned operations and/or functions are intended to implement the corresponding flows in the method 300 in FIG. 4 and will not be elaborated herein for simplicity.

According to the device for D2D communication of the embodiment of the disclosure, at least two terminal devices negotiate to determine a central terminal device and member terminal device(s) in a group, and then the central terminal device in the group may allocate a radio resource configured for D2D communication to the member terminal device(s) in the group, so that resource scheduling may be implemented even without coordination of a cellular network (for example, an existing V2V communication technology, or, a network device coverage-free D2D communication technology). Therefore, the problem of collision caused by resource sharing may effectively be solved, a D2D communication success rate may be increased, a communication time delay may be reduced, a D2D communication capacity may be expanded, and efficiency and reliability of the D2D communication may be improved.

It is important to note that the method embodiment of the disclosure may be applied to a processor or implemented by the processor. The processor may be an integrated circuit chip with a signal processing capability. In an implementation process, each step of the method embodiments may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, step and logical block diagram disclosed in the embodiments of the disclosure may be implemented or executed. The universal processor may be a microprocessor or the processor may also be any conventional processor and the like. The operations of the methods disclosed in combination with the embodiments of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium is located in a memory, and the processor reads information in the memory, and completes the operations of the methods in combination with hardware.

It can be understood that the memory in the embodiment of the disclosure may be a volatile memory or a nonvolatile memory, or may include both the volatile arid nonvolatile memories, wherein the nonvolatile memory may be a ROM, a PROM, an EPROM, an EEPROM or a flash memory. The volatile memory may be a RAM, and is used as an external high-speed cache. It is exemplarily but unlimitedly described that RAMS in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DR RAM). It is important to note that the memory of a system and method described in the disclosure is intended to include, but not limited to, memories of these and any other proper types.

It should be understood that, in various embodiments of the disclosure, a magnitude of a sequence number of each process does not mean an execution sequence and the execution sequence of each process should be determined by its function and an internal logic and should not form any limit to an implementation process of the embodiments of the disclosure.

Those of ordinary skilled in the art may realize that the units and algorithm operations of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by virtue of different methods, but such realization shall fall within the scope of the disclosure.

Those skilled in the art may clearly learn about that specific working processes of the system, device and unit described above may refer to the corresponding processes in the method embodiments and will not be elaborated herein for convenient and brief description.

In some embodiments provided by the application, it should be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each function unit in each embodiment of the disclosure may be integrated into a processing unit, each unit may also exist independently, and two or more than two units may also be integrated into a unit.

When being realized in form of software function unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a piece of computer device (which may be a personal computer, a server, network device or the like) to execute all or part of the operations of the method in each embodiment of the disclosure. The abovementioned storage medium includes: various media capable of storing program codes such as a U disk, a mobile hard disk, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for Device-to-Device (D2D) communication, comprising:
   generating, by a first terminal device, a first sequence;
   transmitting, by the first terminal device, first indication information indicative of the first sequence and device information of the first terminal device, wherein one piece of device information in uniquely indicative of one terminal device;

receiving, by the first terminal device, at least one piece of second indication information, that at least one piece of second indication information corresponding to at least one third terminal device on to one and each piece of second indication information being indicative of a second sequence generated by a corresponding third terminal device and device information of the corresponding third terminal device; and when a relationship between the first sequence and the second sequence meets a preset condition, determining, by the first terminal device, the first terminal device to be a central terminal device of a first group, wherein the first group comprises the central terminal device and at least one member terminal device;

allocating, by the first terminal device, a first radio resource to a second terminal device, to enable the second terminal device to perform D2D communication with the first radio resource, wherein the second terminal device is a member terminal device of the first group; and wherein the method further comprises at least one of the following:

transmitting, by the first terminal device, a first sounding signal, to enable the third terminal device, after determining that a signal strength of the received first sounding signal is higher than or equal to a first present strength, to transmit the second indication information, or to enable the third terminal device, after determining that a distance between the first terminal device and the second terminal device determined based on the received first sounding signal is smaller than or equal to a first preset distance, to transmit the second indication information; or receiving, by the first terminal device, a second sounding signal, the second sounding signal being transmitted by the third terminal device, wherein the first indication information is transmitted by the first terminal device, after determining that a signal strength of the received second sounding signal is higher than or equal to a first preset strength, or after determining that a distance between the first terminal device and the third terminal device determined based on the received second sounding signal is smaller than or equal to the first preset distance.

2. The method according to claim 1, further comprising:
when the relationship between the first sequence and the second sequence meets the preset condition, determining, by the first terminal device, that the third terminal device is a member terminal device of the first group.

3. The method according to claim 1, wherein before the first terminal device determines the first terminal device to be the central terminal device of the first group, the method further comprises:

when the relationship between the first sequence and the second sequence meets the preset condition, transmitting, by the first terminal device, third indication information indicating that the first terminal device requests to be the central terminal device, wherein determining, by the first terminal device, the first terminal device to be the central terminal device of the first group comprises:

receiving, by the first terminal device, fourth indication information indicating that the third terminal device allows the first terminal device to be the central terminal device of the first group, the fourth indication information being transmitted by the third terminal device responsive to determination of the relationship between the first sequence and the second sequence meeting the preset condition, and determining, by the first terminal device, the first terminal device to be the central terminal device of the first group and the third terminal device to be a member terminal device, according to the fourth indication information;

or, responsive to determination of fifth indication information not being received within a preset time period T after transmitting the third indication information, determining, by the first terminal device, the first terminal device to be the central terminal device of the first group, and determining the third terminal device to be a member terminal device, wherein the fifth indication information indicates that the third terminal device does not allow the first terminal device to be the central terminal device of the first group;

or, responsive to determination of the fifth indication information being received within the preset time period T after transmitting the third indication information, retransmitting, by the first terminal device, the first indication information, wherein the fifth indication information indicates that the third terminal device does not allow the first terminal device to be the central terminal device of the first group;

or, in case of receiving the fifth indication information after the preset time period T, determining, by the first terminal device, that the third terminal device does not belong to the first group.

4. The method according to claim 1, further comprising at least one of the following:

allocating, by the first terminal device, an intra-group Identifier (ID) to each terminal device in the first group, wherein one intra-group ID is uniquely indicative of one terminal device in the first group, and transmitting, by the first terminal device, sixth indication information indicative of the intra-group IDs of the terminal devices in the first group, to enable the terminal devices in the first group to perform D2D communication based on the intra-group IDs;

or, determining, by the first terminal device, a group ID of the first group, wherein a group ID indicates a device group, periodically transmitting, by the first terminal device, a first group broadcast signal, the first group broadcast signal carrying the group ID of the first group and the device information of the first terminal device, and detecting, by the first terminal device, at least one second group broadcast signal, the at least one second group broadcast signal corresponding to at least one second group one to one, each second group broadcast signal being periodically transmitted by the central terminal device of a corresponding second group and carrying a group ID of the corresponding second group and device information of the central terminal device of the corresponding second group; and wherein the method further comprises: responsive to determination of the group ID of the second group being the same as the group ID of the first group, changing, by the first terminal device, the group ID of the first group or, transmitting by the first terminal device, ninth indication information indicating, to the central terminal device of the second group, changing the group ID of the second group.

5. The method according to claim 4, further comprising at least one of the following:
receiving, by the first terminal device, a first request message from a fourth terminal device, wherein the first request message carries device information of the fourth terminal device, and indicates that the fourth terminal device requests to join the first group, wherein the first request message is transmitted by the second terminal device after determining that a signal strength of the received first group broadcast signal is higher than or equal to a second preset strength, or, after determining that a distance between the first terminal device and the fourth terminal device determined based on the received first group broadcast signal is smaller than or equal to a second preset distance, and determining, by the first terminal device, that the fourth terminal device is a member terminal device of the first group according to the first request message;
receiving, by the first terminal device, a second request message from a fifth terminal device in the first group, the fifth terminal device being a member terminal device of the first group, wherein the second request message indicates that the fifth terminal device requests to exit from the first group, and the second request message is transmitted by the fifth terminal device after determining that a signal strength of the received first group broadcast signal is lower than a second preset strength, or, after determining that a distance between the first terminal device and the fifth terminal device determined based on the received first group broadcast signal is larger than a second preset distance, and determining, by the first terminal device, that the fifth terminal device is not a member terminal device of the first group according to the second request message; or,
detecting, by the first terminal device, a heartbeat signal from a sixth terminal device, which is a member terminal device of the first group, wherein the heartbeat signal carries device information of the sixth terminal device, and is transmitted by the sixth terminal device at a preset interval after determining to be a member terminal device of the first group, and responsive to determination of the heartbeat signal not being received within a preset duration, determining, by the first terminal device, that the sixth terminal device is not a member terminal device of the first group, wherein the preset duration is larger than or equal to a duration of the preset interval, the sixth terminal device stops transmitting the heartbeat signal after determining that a signal strength of the received first group broadcast signal is lower than a second preset strength, or, after determining that a distance between the first terminal device and the sixth terminal device determined based on the received first group broadcast signal is larger than a second preset distance.

6. The method according to claim 1, wherein the first radio resource is used for the second terminal device to transmit first data to a seventh terminal device in the first group, and
wherein the method further comprises at least one of the following:
transmitting, by the first terminal device, indication information about the first radio resource to the seventh terminal device;
transmitting, by the first terminal device, tenth indication information to the seventh terminal device, wherein the tenth indication information indicates, to the seventh terminal device, transmitting a sounding signal; or
allocating, by the first terminal device, a second radio resource to the seventh terminal device to enable the seventh terminal device to transmit feedback information for the first data through the second radio resource.

7. The method according to claim 1, further comprising:
receiving, by the first terminal device, a third group broadcast signal, the third group broadcast signal being periodically transmitted by a central terminal device of a third group and carrying a group ID of the third group and device information of the central terminal device of the third group; and
performing, by the first terminal device, communication with the central terminal device of the third group according to the third group broadcast signal to determine terminal devices comprised in the third group and enable the central terminal device of the third group to learn about the terminal devices comprised in the first group.

8. The method according to claim 1, further comprising at least one of the following:
receiving, by the first terminal device, second data from the second terminal device with the first radio resource, wherein the second data is to be transmitted to an eighth terminal device and the eighth terminal device belongs to the third group, determining, by the first terminal device, a third radio resource, the third radio resource being allocated to the first terminal device by the central terminal device of the third group, and transmitting, by the first terminal device, the second data to the central terminal device of the third group or the eighth terminal device with the third radio resource;
receiving, by the first terminal device, third data from the central terminal device of the third group with a fourth radio resource, wherein the fourth radio resource is allocated by the central terminal device of the third group and the third data is to be transmitted to the second terminal device, and transmitting, by the first terminal device, the third data to the second terminal device with the first radio resource;
receiving, by the first terminal device, fourth data from the second terminal device with the first radio resource, wherein the fourth data is to be transmitted to a network device, and transmitting, by the first terminal device, the fourth data to the network device; or
receiving, by the first terminal device, fifth data from a network device, wherein the fifth data is to be transmitted to the second terminal device, and transmitting, by the first terminal device, the fifth data to the second terminal device with the first radio resource.

9. The method according to claim 1, further comprising:
transmitting, by the first terminal device, a third request message indicating that the first terminal device requests to change the central terminal device of the first group;
receiving, by the first terminal device, a fourth request message from a ninth terminal device, which is a member terminal device of the first group, wherein the fourth request message indicates that the ninth terminal device requests to be the central terminal device of the first group, and is transmitted by the ninth terminal device according to the third request message; and determining, by the first terminal device, the ninth terminal device to be the central terminal device of the first group according to the fourth request message.

10. A method for Device-to-Device (D2D) communication, comprising:
transmitting, by the second terminal device second indication information indicating the second sequence and device information of the second terminal device, wherein one piece of device information is uniquely indicative of one terminal device;
receiving, by the second terminal device, first indication information indicating a first sequence generated by the first terminal device and device information of the first terminal device; and
when a relationship between the first sequence and the second sequence meets a preset condition, determining, by the second terminal device, the second terminal device to be a member terminal device of a first group, wherein the first group comprises a central terminal device and at least one member terminal device,
performing, by the second terminal device, D2D communication with a first radio resource allocated by the central terminal device of the first group; and
wherein the method further comprises;
transmitting, by the second terminal device, a second sounding signal, to enable the first terminal device to transmit the first indication information after determining that a signal strength of the received second sounding signal is higher than or equal to a first preset strength, or enable the first terminal device to transmit device and the second terminal device determined based on the received second sounding signal is smaller than or equal to a first preset distance; or
receiving, by the second terminal device, a first sounding signal from the first terminal device, wherein the second indication information is transmitting by the second terminal device, after determining that a signal strength of the received first sound signal is higher than or equal to a first preset strength, or after determining that a distance between the first terminal device and the second terminal device determined based on the received first sounding signal is smaller than or equal to a first preset distance.

11. The method according to claim 10, further comprising:
when the relationship between the first sequence and the second sequence meets the preset condition, determining, by the second terminal device, the first terminal device to be the central terminal device of the first group.

12. The method according to claim 11, wherein the method further comprises at least one of the following:
before the second terminal device determines the second terminal device to be the member terminal device of the first group, receiving, by the second terminal device, third indication information from the first terminal device, the third indication information indicating that the first terminal device requests to be the central terminal device, and responsive to determination of the relationship between the first sequence and the second sequence meeting the preset condition, transmitting, by the second terminal device, fourth indication information indicating that the second terminal device allows the first terminal device to be the central terminal device of the first group; or after the second terminal device determines the first terminal device to be the central terminal device of the first group receiving, by the second terminal device, a third request message from the first terminal device, the third request message indicates that the first terminal device requests to change the central terminal device of the first group; and transmitting, by the second terminal device, a fourth request message to the first terminal device according to the third request message, wherein the fourth request message indicates that the second terminal device requests to be the central terminal device of the first group.

13. The method according to claim 10, further comprising at least one of the following:
receiving, by the second terminal device, sixth indication information from the first terminal device, wherein the sixth indication information indicates an intra-group Identifier (ID) allocated to the second terminal device by the first terminal device, wherein the second terminal device performs D2D communication based on the intra-group ID with the first radio resource allocated by the central terminal device of the first group; or
receiving, by the second terminal device, a first group broadcast signal periodically transmitted by the first terminal device, the first group broadcast signal carrying a group ID of the first group and device information of the first terminal device, wherein the group ID of the first group is determined by the first terminal device, and a group ID indicates a device group.

14. The method according to claim 13, wherein the method further comprises at least one of the following:
before determining the second terminal device to be the member terminal device of the first group, transmitting, by the second terminal device, a first request message to the first terminal device after determining that a signal strength of the received first group broadcast signal is higher than or equal to a second preset strength or after determining that the distance, determined based on the received first group broadcast signal, between the first terminal device and the second terminal device is smaller than or equal to a second preset distance, wherein the first request message carries the device information of the second terminal device, and the first request message indicates that the second terminal device requests to join the first group;
transmitting, by the second terminal device, a second request message to the first terminal device, after determining that a signal strength of the received first group broadcast signal is lower than a second preset strength, or, after determining that a distance between the first terminal device and the second terminal device determined based on the received first group broadcast signal is larger than a second preset distance, wherein the second request message indicates that the second member terminal device requests to exit from the first group; or
transmitting, by the second terminal device determined to be the member terminal device of the first group, a heartbeat signal to the first terminal device at a preset interval, and stopping transmitting, by the second terminal device, the heartbeat signal after determining that a signal strength of the received first group broadcast signal is lower than a second preset strength or after determining that a distance between the first terminal device and the second terminal device determined based on the received first group broadcast signal is larger than a second preset distance.

15. The method according to claim 10, wherein at least one of the following applies:
  wherein performing, by the second terminal device, D2D communication with the first radio resource allocated by the central terminal device of the first group comprises at least one of the following:
    transmitting, by the second terminal device, first data to a seventh terminal device in the first group with the first radio resource;
    transmitting, by the second terminal device, second data to the first terminal device with the first radio resource, wherein the second data is to be transmitted to an eighth terminal device, and the eighth terminal device belongs to a third group;
    receiving, by the second terminal device, third data from the first terminal device with the first radio resource, wherein the third data has been transmitted to the first terminal device by a central terminal device of a third group with a fourth radio resource, and the fourth radio resource is allocated by the central terminal device of the third group;
    transmitting, by the second terminal device, fourth data to the first terminal device with the first radio resource, the fourth data is to be transmitted to a network device; or
    receiving, by the second terminal device, fifth data from the first terminal device with the first radio resource, wherein the fifth data has been transmitted to the first terminal device by a network device;
  or,
  wherein the method further comprises:
    receiving, by the second terminal device, third data from a central terminal device of a third group with a fourth radio resource, the fourth radio resource being allocated by the central terminal device of the third group.

16. A terminal device, comprising:
  a processor; and
  a memory storing instructions, which, when executed by the processor, cause the processor to implement one or more actions comprising:
    generating, by first terminal device, a first sequence;
    transmitting, by the first terminal device, first indication information indicative of the first sequence and device information of the first terminal device, wherein one piece of device information is uniquely indicative of one terminal device;
    receiving, by the first terminal device, at least one piece of second indication information, the at least one piece of second indication information corresponding to at least one third terminal device one to one and each piece of second indication information being indicative of a second sequence generated by a corresponding third terminal device and device information of the corresponding third terminal device; and
    when a relationship between the first sequence and the second sequence meets a preset condition, determining, by the first terminal device, the first terminal device to be a central terminal device of a first group, wherein the first group comprises the central terminal device and at least one member terminal device;
    allocating a first radio resource to a second terminal device, to enable the second terminal device to perform D2D communication with the first radio resource, wherein the second terminal device is a member terminal device of the first group;
  and further cause the processor to implement at least one of the following:
    transmitting, by the first terminal device, a first sounding signal, to enable the third terminal device, after determining that a signal strength of the received first sounding sign is higher than or equal to a first preset strength, to transmit the second indication information, or to enable the third terminal device, after determining that a distance between the first terminal device and the second terminal device determined based on the received first sounding signal is smaller than or equal to a first preset distance, to transmit the second indication information; or
    receiving, by the first terminal device a second sounding signal, the second sounding signal being transmitted by the third terminal device, wherein the first indication information is transmitted by the first terminal device, after determining that a signal strength of the received second sounding signal is higher than or equal to a first preset strength, or after determining that a distance between the first terminal device and the third terminal device determined based on the received second sounding signal is smaller than or equal to the first preset distance.

* * * * *

UNITED STATES PATENT AND TRADEMARK OFFICE
CERTIFICATE OF CORRECTION

| | | |
|---|---|---|
| PATENT NO. | : 10,575,283 B2 | Page 1 of 1 |
| APPLICATION NO. | : 16/085549 | |
| DATED | : February 25, 2020 | |
| INVENTOR(S) | : Hai Tang | |

It is certified that error appears in the above-identified patent and that said Letters Patent is hereby corrected as shown below:

On the Title Page

Item (73) Assignee:
"GUANGDONG OPPO MOBILE TELECOMMUNICATIONS CORP., LTD, Dongguan, Guangdong (CN)"

Is changed to:
--GUANGDONG OPPO MOBILE TELECOMMUNICATIONS CORP., LTD., Dongguan, Guangdong (CN)--

Signed and Sealed this
Twenty-second Day of December, 2020

Andrei Iancu
*Director of the United States Patent and Trademark Office*